US010301179B2

(12) United States Patent
Sakai et al.

(10) Patent No.: US 10,301,179 B2
(45) Date of Patent: May 28, 2019

(54) ELECTROCHEMICAL HYDROGEN PUMP

(71) Applicant: Panasonic Intellectual Property Management Co., Ltd., Osaka (JP)

(72) Inventors: Osamu Sakai, Osaka (JP); Kunihiro Ukai, Nara (JP); Hidenobu Wakita, Kyoto (JP); Yukimune Kani, Osaka (JP); Yuuichi Yakumaru, Osaka (JP); Takashi Sotoku, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 83 days.

(21) Appl. No.: 15/726,445

(22) Filed: Oct. 6, 2017

(65) Prior Publication Data

US 2018/0155193 A1    Jun. 7, 2018

(30) Foreign Application Priority Data

Dec. 6, 2016 (JP) ................................. 2016-236379
Dec. 6, 2016 (JP) ................................. 2016-236380

(51) Int. Cl.
*C01B 3/58* (2006.01)
*H01M 8/14* (2006.01)
(Continued)

(52) U.S. Cl.
CPC .............. *C01B 3/58* (2013.01); *B01D 53/326* (2013.01); *C01B 3/503* (2013.01); *C25B 1/12* (2013.01);
(Continued)

(58) Field of Classification Search
CPC .......... C01B 3/58; C01B 3/503; H01M 8/248; H01M 8/0232; H01M 8/0271; H01M 8/141; H01M 8/0681; H01M 8/04201
See application file for complete search history.

(56) References Cited

U.S. PATENT DOCUMENTS

2007/0207365 A1* 9/2007 Ohnuma ............. H01M 8/0206
                                                    429/434
2010/0209807 A1* 8/2010 Shintani .............. H01M 4/8657
                                                    429/483
(Continued)

FOREIGN PATENT DOCUMENTS

JP    2001-342587    12/2001
JP    2006-070322    3/2006
JP    2006-111924    4/2006

*Primary Examiner* — Stewart A Fraser
(74) *Attorney, Agent, or Firm* — McDermott Will & Emery LLP

(57) ABSTRACT

An apparatus includes: an electrolyte membrane; a cathode catalyst layer provided to one main surface of the electrolyte membrane; an anode catalyst layer provided to the other main surface of the electrolyte membrane; a cathode gas diffusion layer provided on a main surface of the cathode catalyst layer not facing the electrolyte membrane; a separator including a recess through which cathode gas flows; an anode gas diffusion layer provided on a main surface of the anode catalyst layer not facing the electrolyte membrane; a voltage applicator applying a voltage between the cathode catalyst layer and the anode catalyst layer; and a fastener fastening a laminated body. The cathode gas diffusion layer is accommodated in the recess, projects from the recess in a thickness direction before fastening of the laminated body, and includes an elastic member between side surfaces of the cathode gas diffusion layer and of the recess.

6 Claims, 11 Drawing Sheets

(51) Int. Cl.
*C25B 1/12* (2006.01)
*H01M 8/04082* (2016.01)
*H01M 8/0662* (2016.01)
*B01D 53/32* (2006.01)
*C01B 3/50* (2006.01)
*H01M 8/248* (2016.01)
*H01M 8/0232* (2016.01)
*H01M 8/0271* (2016.01)
*H01M 8/1018* (2016.01)

(52) U.S. Cl.
CPC ....... *H01M 8/0232* (2013.01); *H01M 8/0271* (2013.01); *H01M 8/04201* (2013.01); *H01M 8/0681* (2013.01); *H01M 8/141* (2013.01); *H01M 8/248* (2013.01); *B01D 2256/16* (2013.01); *H01M 2008/1095* (2013.01); *Y02E 60/366* (2013.01)

(56) References Cited

U.S. PATENT DOCUMENTS

| | | | | |
|---|---|---|---|---|
| 2010/0216048 A1* | 8/2010 | Braeuninger | ......... | H01M 4/881 429/483 |
| 2010/0221633 A1* | 9/2010 | Fujita | .................... | H01M 8/241 429/452 |
| 2010/0291472 A1* | 11/2010 | Suzuki | ................ | H01M 8/0258 429/513 |
| 2014/0377679 A1* | 12/2014 | Yamamoto | ........... | H01M 8/006 429/454 |
| 2017/0233878 A1* | 8/2017 | Yakumaru | ................. | C25B 9/08 204/265 |

* cited by examiner

ELECTROCHEMICAL HYDROGEN PUMP

BACKGROUND

1. Technical Field

The present disclosure relates to an electrochemical hydrogen pump.

2. Description of the Related Art

In recent years, hydrogen has been attracting attention as clean alternative energy resources that replace fossil fuels in view of environmental problems such as global warning and energy problems such as exhaustion of oil resources. Basically only water is emitted in a case where hydrogen is combusted, carbon dioxide as a cause of global warming is not discharged, and nitrogen oxides or the like is hardly discharged. Thus, hydrogen is expected as clean energy. Further, an example of an apparatus that highly efficiently uses hydrogen as a fuel is a fuel cell. Development and popularization of the fuel cell have been progressing for vehicle power sources and household power generation.

In a hydrogen-based society in the future, it is desired to develop techniques in which in addition to production of hydrogen, hydrogen gas may be stored at high density and transported or used by a small capacity and low cost. Particularly, a fuel supply infrastructure has to be built for promotion of popularization of the fuel cells as distributed energy sources. Further, in order to stably supply hydrogen to the fuel supply infrastructure, various suggestions for refinement and pressurization of high purity hydrogen gas have been made.

For example, a method has been known in which a MEA configured with an electrolyte membrane, feeders (gas diffusion layers), catalyst layers, and so forth is used, a voltage is applied between an anode and a cathode of the MEA, and high-pressure hydrogen gas (cathode gas) is thereby generated on a cathode side of the MEA (for example, see Japanese Unexamined Patent Application Publication No. 2001-342587). Here, it is pointed out that a contact resistance between the electrolyte membrane and a cathode feeder increases in a case where the electrolyte membrane, an anode feeder, and so forth are deformed due to pressing by the cathode gas in a high pressure state (for example, see Japanese Unexamined Patent Application Publication No. 2006-70322 and Japanese Unexamined Patent Application Publication No. 2006-111924).

Accordingly, Japanese Unexamined Patent Application Publication No. 2006-70322 suggests a pressing section that may press a cathode feeder to an electrolyte membrane and cause the cathode feeder to tightly contact with the electrolyte membrane so that the contact resistance between the electrolyte membrane and the cathode feeder does not easily increase even in a case where the cathode gas is in a high pressure state.

Further, Japanese Unexamined Patent Application Publication No. 2006-111924 suggests that a cathode feeder formed of an elastic material is in advance compressed so that the contact resistance between the electrolyte membrane and the cathode feeder does not easily increase even in a case where the cathode gas is in a high pressure state.

SUMMARY

However, in related art, simple and appropriate inhibition of an increase in a contact resistance between an electrolyte membrane and a cathode feeder is not sufficiently discussed. Details will be described in embodiments.

One non-limiting and exemplary embodiment provides an electrochemical hydrogen pump that may simply and appropriately inhibit an increase in a contact resistance between a cathode catalyst layer and a cathode gas diffusion layer compared to related art.

In one general aspect, the techniques disclosed here feature an apparatus including: an electrolyte membrane that includes a pair of main surfaces; a cathode catalyst layer that is provided to one main surface of the electrolyte membrane; an anode catalyst layer that is provided to the other main surface of the electrolyte membrane; a cathode gas diffusion layer that is provided on a main surface of the cathode catalyst layer which does not face the electrolyte membrane; a separator that includes a recess through which cathode gas led out from the cathode gas diffusion layer flows; an anode gas diffusion layer that is provided on a main surface of the anode catalyst layer which does not face the electrolyte membrane; a voltage applicator that applies a voltage between the cathode catalyst layer and the anode catalyst layer; and a fastener that fastens a laminated body of the electrolyte membrane, the cathode catalyst layer, the anode catalyst layer, the cathode gas diffusion layer, and the anode gas diffusion layer, in which the cathode gas diffusion layer is accommodated in the recess, is disposed to project from the recess in a thickness direction of the recess before fastening of the laminated body, and includes an elastic member between a side surface of the cathode gas diffusion layer and a side surface of the recess.

The electrochemical hydrogen pump of one aspect of the present disclosure may simply and appropriately inhibit an increase in a contact resistance between the cathode catalyst layer and the cathode gas diffusion layer compared to related art.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
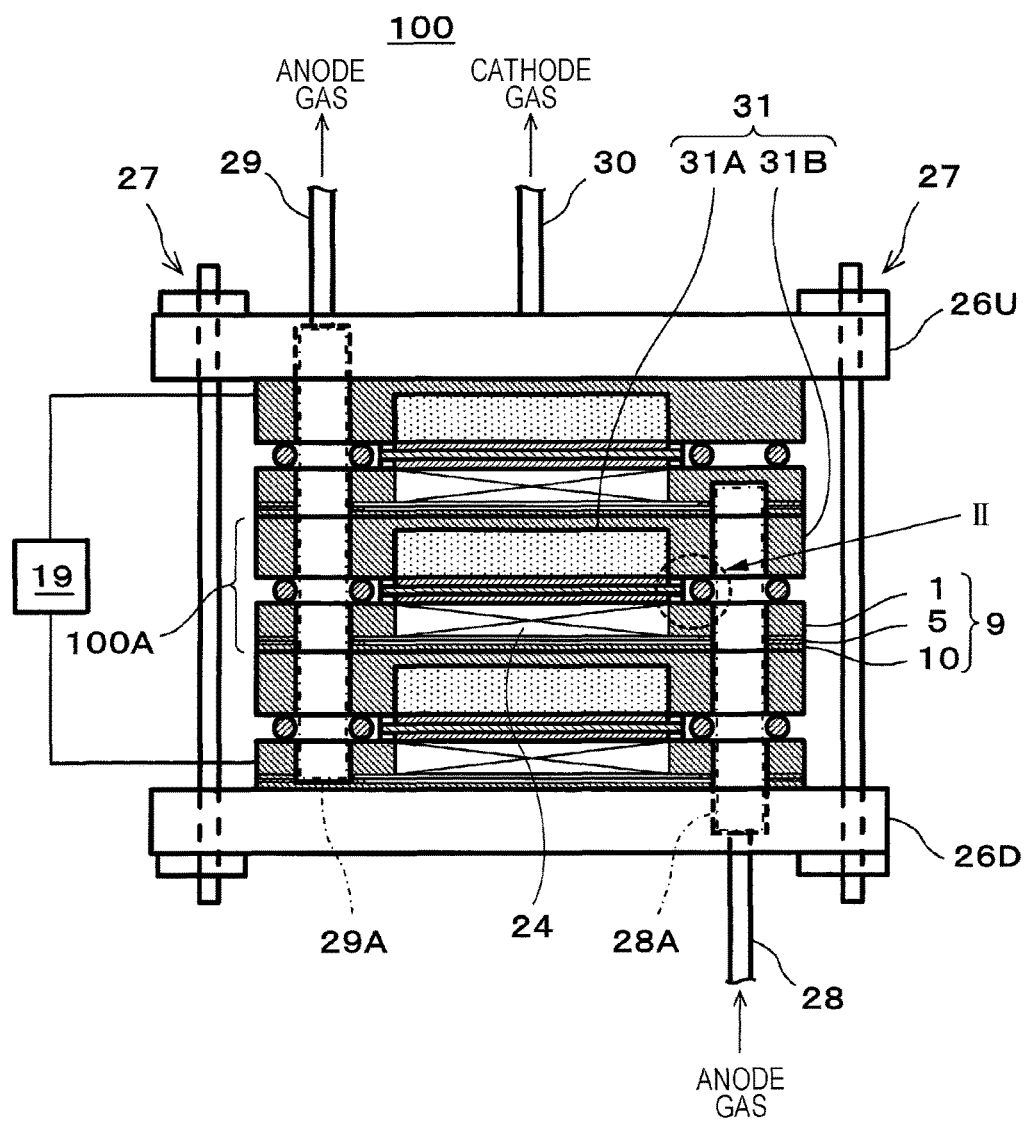
FIG. 1 is a diagram that illustrates one example of an electrochemical hydrogen pump of a first embodiment.

As described above, Japanese Unexamined Patent Application Publication No. 2006-70322 and Japanese Unexamined Patent Application Publication No. 2006-111924 also discuss configurations that inhibit an increase in a contact resistance between an electrolyte membrane and a cathode feeder. However, there is still room for improvement.

For example, in Japanese Unexamined Patent Application Publication No. 2006-70322, because a pressing section has to be provided which presses the cathode feeder to the electrolyte membrane and causes the cathode feeder to tightly contact with the electrolyte membrane, the number of components increases. This leads to complication of an apparatus and a cost increase.

Accordingly, an apparatus of a first aspect of the present disclosure includes: an electrolyte membrane that includes a pair of main surfaces; a cathode catalyst layer that is provided to one main surface of the electrolyte membrane; an anode catalyst layer that is provided to the other main surface of the electrolyte membrane; a cathode gas diffusion layer that is provided on a main surface of the cathode catalyst layer which does not face the electrolyte membrane; a separator that includes a recess through which cathode gas led out from the cathode gas diffusion layer flows; an anode gas diffusion layer that is provided on a main surface of the anode catalyst layer which does not face the electrolyte membrane; a voltage applicator that applies a voltage between the cathode catalyst layer and the anode catalyst layer; and a fastener that fastens a laminated body of the electrolyte membrane, the cathode catalyst layer, the anode catalyst layer, the cathode gas diffusion layer, and the anode gas diffusion layer, in which the cathode gas diffusion layer is accommodated in the recess, is disposed to project from the recess in a thickness direction of the recess before fastening of the laminated body, and includes an elastic member between a side surface of the cathode gas diffusion layer and a side surface of the recess.

In such a configuration, the apparatus of the first aspect may simply and appropriately inhibit an increase in a contact resistance between the cathode catalyst layer and the cathode gas diffusion layer compared to related art.

Specifically, in a case where the cathode gas of the apparatus becomes a high pressure state in a case of the action of the apparatus, the cathode gas may not pass through the electrolyte membrane, and a high pressure is thus exerted on the anode gas diffusion layer, the anode catalyst layer, and the electrolyte membrane. Then, each of the anode gas diffusion layer, the anode catalyst layer, and the electrolyte membrane is compressed and deformed. However, here, in the apparatus of this aspect, the cathode gas diffusion layer elastically deforms in the direction in which the cathode gas diffusion layer is recovered from the compressed thickness by the fastener to the uncompressed thickness, and the contact between the cathode catalyst layer and the cathode gas diffusion layer may thereby be maintained appropriately. Thus, because a dedicated member for pressing the cathode gas diffusion layer to the cathode catalyst layer is not requested, the above increase in the contact resistance may be inhibited by a simpler configuration than the techniques disclosed in Japanese Unexamined Patent Application Publication No. 2006-70322.

Here, in a case where the cathode gas diffusion layer projects from the recess before the fastening, the cathode gas diffusion layer is compressed by a fastening pressure in the vertical direction to a main surface but is stretched in the parallel direction with this main surface, in the fastening. Then, hypothetically, in a case where the elastic member is not provided between the side surface of the cathode gas diffusion layer and the side surface of the recess, the cathode gas diffusion layer projects from the recess in a periphery of the recess, and this projecting portion possibly causes damage to the cathode catalyst layer or the electrolyte membrane. However, in the apparatus of this aspect, as the above configuration, the elastic member is provided between the side surface of the cathode gas diffusion layer and the side surface of the recess, the stretch of the cathode gas diffusion layer in the parallel direction with the main surface of the cathode gas diffusion layer is thereby absorbed, and the possibility that the cathode gas diffusion layer projects from the recess in the periphery of the recess may thereby be reduced.

Further, as for the apparatus of a second aspect of the present disclosure, in the apparatus in the first aspect, a thickness of the cathode gas diffusion layer at a time before fastening of the laminated body may be set such that a size of a compressed thickness of the cathode gas diffusion layer in a case of fastening of the laminated body is equal to or larger than a total value of sizes of respective compressed thicknesses of the anode gas diffusion layer, the anode catalyst layer, and the electrolyte membrane in a case of an action.

How much the cathode feeder is in advance compressed and deformed in fastening of an anode feeder and the cathode feeder may not appropriately be known from Japanese Unexamined Patent Application Publication No. 2006-111924. For example, Japanese Unexamined Patent Application Publication No. 2006-111924 does not discuss the compression amount of the anode feeder that occurs because the cathode gas becomes a high pressure state in a case of an action of a high-pressure hydrogen production apparatus. However, in the apparatus of this aspect, as the above configuration, the size of the compressed thickness of the cathode gas diffusion layer in a case of the fastening of the laminated body is decided in consideration of the total value of the sizes of the respective compressed thicknesses of the anode gas diffusion layer, the anode catalyst layer, and the electrolyte membrane in a case of the action of the apparatus. Thus, the above increase in the contact resistance may be inhibited more appropriately than the techniques disclosed in Japanese Unexamined Patent Application Publication No. 2006-111924.

Further, as for the apparatus of a third aspect of the present disclosure, in the apparatus of the first aspect, the cathode gas diffusion layer may have higher rigidity on a side that faces the separator than a side that faces to the cathode catalyst layer.

The fastening force of the laminated body is exerted on the cathode gas diffusion layer through the above cathode separator. Thus, the rigidity of the cathode gas diffusion layer on the side that faces the cathode separator is made higher than that on the side that faces to the cathode catalyst layer, and it is thereby possible that the fastening force is uniformly exerted on the cathode gas diffusion layer compared to the opposite case. Then, because the cathode gas diffusion layer and the cathode catalyst layer may be brought into contact at a uniform pressure, the increase in the contact resistance between the cathode catalyst layer and the cathode gas diffusion layer may be inhibited further effectively.

Further, as for the apparatus of a fourth aspect of the present disclosure, in the apparatus of the first aspect, the cathode gas diffusion layer may have higher porosity on a side that faces the cathode catalyst layer than a side that faces to the separator.

As the porosity of the cathode gas diffusion layer becomes higher, the gas permeability of the cathode gas diffusion layer becomes higher. Thus, in a case where the porosity of the cathode gas diffusion layer on the side that faces the cathode catalyst layer is higher, the cathode gas is easily drawn from the cathode catalyst layer into the cathode gas diffusion layer compared to the opposite case. Further, as the porosity of the cathode gas diffusion layer becomes higher, the cathode gas diffusion layer is more easily crushed. Thus, in a case where the porosity of the cathode gas diffusion layer on the side that faces the cathode catalyst layer is higher, the tightness of contact between the cathode catalyst layer and the cathode gas diffusion layer may be improved compared to the opposite case.

As for the apparatus of a fifth aspect of the present disclosure, in the apparatus of the first aspect, the separator may include a manifold hole through which the cathode gas flows and a gas flow path that leads out the cathode gas in the recess to the manifold hole.

In such a configuration, the cathode gas may be taken out from the cathode gas diffusion layer in a high pressure state through the gas flow path.

Further, as for the apparatus of a sixth aspect of the present disclosure, in the apparatus of any of the first aspect to the fifth aspect, the cathode gas diffusion layer may be configured with a sintered body of metal fiber.

In such a configuration, the cathode gas diffusion layer is configured with the sintered body of metal fiber, and it thereby becomes easy to secure elasticity and gas permeability that are requested for the cathode gas diffusion layer compared to a case where the cathode gas diffusion layer is configured with a metal steel plate provided with plural vent holes.

As described above, in Japanese Unexamined Patent Application Publication No. 2006-70322, because a pressing section has to be provided which presses the cathode feeder to the electrolyte membrane and causes the cathode feeder to tightly contact with the electrolyte membrane, the number of components increases. This leads to complication of an apparatus and a cost increase.

Further, how the cathode feeder is in advance compressed and deformed in the fastening of the anode feeder and the cathode feeder may not appropriately be known from Japanese Unexamined Patent Application Publication No. 2006-111924. For example, Japanese Unexamined Patent Application Publication No. 2006-111924 does not discuss a problem that the deformation of the electrolyte membrane, the anode feeder, and so forth do not become uniform in the planes because the cathode gas of the high-pressure hydrogen production apparatus becomes a high pressure state in a case of the action of the high-pressure hydrogen production apparatus.

Accordingly, an apparatus of a seventh aspect of the present disclosure includes: an electrolyte membrane that includes a pair of main surfaces; a cathode catalyst layer that is provided to one main surface of the electrolyte membrane; an anode catalyst layer that is provided to the other main surface of the electrolyte membrane; a cathode gas diffusion layer that is provided on a main surface of the cathode catalyst layer which does not face the electrolyte membrane; an anode gas diffusion layer that is provided on a main surface of the anode catalyst layer which does not face the electrolyte membrane; a separator that includes a recess through which cathode gas led out from the cathode gas diffusion layer flows; a voltage applicator that applies a voltage between the cathode catalyst layer and the anode catalyst layer; and a fastener that fastens a laminated body of the electrolyte membrane, the cathode catalyst layer, the anode catalyst layer, the cathode gas diffusion layer, the anode gas diffusion layer, and the separator, in which a bottom surface of the recess of the separator includes a protrusion that does not partition flow of the cathode gas, and the cathode gas diffusion layer is accommodated in the recess and is disposed to project from the recess in a thickness direction of the recess before fastening of the laminated body.

In such a configuration, the increase in the contact resistance between the cathode catalyst layer and the cathode gas diffusion layer may simply and appropriately be inhibited compared to related art.

Specifically, in a case where the cathode gas of the apparatus becomes a high pressure state in a case of the action of the apparatus, a high pressure is exerted on the anode gas diffusion layer, the anode catalyst layer, and the electrolyte membrane. Then, each of the anode gas diffusion layer, the anode catalyst layer, and the electrolyte membrane is compressed and deformed. However, here, in the apparatus of this aspect, the cathode gas diffusion layer elastically deforms in the direction in which the cathode gas diffusion layer is recovered from the compressed thickness by the fastener to the uncompressed thickness, and the contact between the cathode catalyst layer and the cathode gas diffusion layer may thereby be maintained appropriately. Thus, because a dedicated member for pressing the cathode gas diffusion layer to the cathode catalyst layer is not requested, the above increase in the contact resistance may be inhibited by a simpler configuration than the techniques disclosed in Japanese Unexamined Patent Application Publication No. 2006-70322.

Further, deformation of the electrolyte membrane, the anode catalyst layer, and the anode gas diffusion layer that occurs in a high pressure state of the cathode gas of the apparatus in a case of the action of the apparatus does not become uniform in the planes of those. For example, in a case where the anode gas diffusion layer is accommodated in an anode main body (anode separator), the compression amount (thickness) of a peripheral portion of the anode gas diffusion layer in the vicinity of the anode main body is smaller than the compression amount (thickness) of a central portion due to the rigidity of the anode main body. Further, for example, in a planar view, in a case where a sealing member (for example, a gasket or the like) is provided so as to surround the anode catalyst layer, the compression amounts (thicknesses) of peripheral portions of the anode catalyst layer in the vicinity of the sealing member and the electrolyte membrane are smaller than the compression amounts (thicknesses) of central portions due to the rigidity of the sealing member. Here, hypothetically, in a case where the bottom surface of the recess of the separator is a flat surface that is not provided with the protrusion, the thickness of the cathode gas diffusion layer at a time after the elastic deformation in the direction in which the cathode gas diffusion layer is recovered from the compressed thickness by the fastener to the uncompressed thickness is thick in a central portion compared to a peripheral portion. Then, because the contact pressure between the cathode catalyst layer and the cathode gas diffusion layer is low in central portions compared to peripheral portions, the contact resistance between both of those possibly becomes non-uniform in the plane. However, in the apparatus of this aspect, the bottom surface of the recess of the separator includes the protrusion, the above thickness of the cathode gas diffusion layer at a time after the elastic deformation may thereby be made uniform in the plane, and such a possibility may thereby be reduced. That is, the increase in the contact resistance between the cathode catalyst layer and the cathode gas diffusion layer may more appropriately be inhibited than the techniques disclosed in Japanese Unexamined Patent Application Publication No. 2006-111924.

As for the apparatus of an eighth aspect of the present disclosure, in the apparatus of the above seventh aspect, the protrusion may be provided in a region that includes a center of gravity of the bottom surface of the recess.

It is speculated that the compression amounts of the anode catalyst layer and the anode gas diffusion layer are largest at the center of gravity of the bottom surface of the recess. Accordingly, the contact between the cathode catalyst layer and the cathode gas diffusion layer may be maintained more appropriately.

Further, as for the apparatus of a ninth aspect of the present disclosure, in the apparatus of the seventh aspect or the eighth aspect, the protrusion may be provided in a region except the periphery of the recess.

In a case where the cathode gas diffusion layer is accommodated in the recess of the cathode separator, in the region except the periphery of the recess of the cathode separator, the electrolyte membrane, the anode catalyst layer, and the anode gas diffusion layer are necessarily pressed due to a high pressure of the cathode gas of the apparatus in a case of the action of the apparatus. Thus, the protrusion is provided in this region, and a possibility that the contact resistance between the cathode catalyst layer and the cathode gas diffusion layer becomes non-uniform in the plane may thereby be reduced effectively.

Further, as for the apparatus of a tenth aspect of the present disclosure, in the apparatus of any of the seventh aspect to the ninth aspect, a size of a thickness of the cathode gas diffusion layer may be equal to or larger than a size of a depth of a peripheral portion of the recess of the separator.

In a case where the cathode gas diffusion layer is accommodated in the recess of the cathode separator, even in the peripheral portion of the recess of the cathode separator, the electrolyte membrane, the anode catalyst layer, and the anode gas diffusion layer are pressed due to a high pressure of the cathode gas of the apparatus in a case of the action of the apparatus. Accordingly, in the apparatus of this aspect, the above configuration may appropriately maintain the contact between the cathode catalyst layer and the cathode gas diffusion layer also in the above peripheral portion.

Further, as for the apparatus of an eleventh aspect of the present disclosure, in the apparatus of any of the seventh aspect to the tenth aspect, the cathode gas diffusion layer may have higher rigidity on a side that faces the separator than a side that faces to the cathode catalyst layer.

The fastening force of the laminated body is exerted on the cathode gas diffusion layer through the above cathode separator. Thus, the rigidity of the cathode gas diffusion layer on the side that faces the cathode separator is made higher than that on the side that faces to the cathode catalyst layer, and it is thereby possible that the fastening force is uniformly exerted on the cathode gas diffusion layer compared to the opposite case. Then, because the cathode gas diffusion layer and the cathode catalyst layer may be brought into contact at a uniform pressure, the increase in the contact resistance between the cathode catalyst layer and the cathode gas diffusion layer may be inhibited further effectively.

Further, as for the apparatus of a twelfth aspect of the present disclosure, in the apparatus of any of the seventh aspect to the eleventh aspect, the cathode gas diffusion layer may have higher porosity on a side that faces the cathode catalyst layer than a side that faces to the separator.

As the porosity of the cathode gas diffusion layer becomes higher, the gas permeability of the cathode gas diffusion layer becomes higher. Thus, in a case where the porosity of the cathode gas diffusion layer on the side that faces the cathode catalyst layer is higher, the cathode gas is easily drawn from the cathode catalyst layer into the cathode gas diffusion layer compared to the opposite case. Further, as the porosity of the cathode gas diffusion layer becomes higher, the cathode gas diffusion layer is more easily crushed. Thus, in a case where the porosity of the cathode gas diffusion layer on the side that faces the cathode catalyst layer is higher, the tightness of contact between the cathode catalyst layer and the cathode gas diffusion layer may be improved compared to the opposite case.

Further, as for the apparatus of a thirteenth aspect of the present disclosure, in the apparatus of any of the seventh aspect to the twelfth aspect, the cathode gas diffusion layer may be configured with a sintered body of metal fiber.

In such a configuration, the cathode gas diffusion layer is configured with the sintered body of metal fiber, and it thereby becomes easy to secure elasticity and gas permeability that are requested for the cathode gas diffusion layer compared to a case where the cathode gas diffusion layer is configured with a metal steel plate provided with plural vent holes.

Further, as for the apparatus of a fourteenth aspect of the present disclosure, in the apparatus of any of the seventh aspect to the thirteenth aspect, the separator may include a manifold hole through which the cathode gas flows and a gas flow path that leads out the cathode gas in the recess to the manifold hole.

In such a configuration, the cathode gas may be taken out from the cathode gas diffusion layer in a high pressure state through the gas flow path.

Embodiments of the above aspects of the present disclosure will hereinafter be described with reference to attached drawings.

The embodiments described in the following illustrate examples of the aspects of the present disclosure. Thus, values, shapes, materials, configuration elements, arrangement positions and connection manners of configuration elements, and so forth that are described in the following do not limit any of the aspects of the present disclosure unless those are described in claims. Further, the configuration elements that are not described in the independent claims which provide the most superordinate concepts of the aspects among the configuration elements in the following will be described as arbitrary configuration elements. Further, the elements to which the same reference characters are given in the drawings may not be described. Further, the drawings schematically illustrate the configuration elements for easy understanding. Shapes, dimension ratios, and so forth may not accurately be depicted.

First Embodiment

General Configuration of Apparatus

Figure 2:
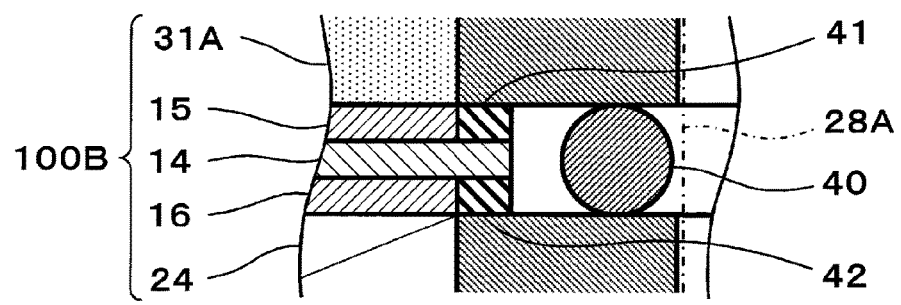
FIG. 2 is a diagram that illustrates one example of the electrochemical hydrogen pump of the first embodiment.

FIG. 1 and FIG. 2 are diagrams that illustrate examples of an electrochemical hydrogen pump of a first embodiment. FIG. 2 is an enlarged diagram of part II in FIG. 1.

As illustrated in FIG. 1 and FIG. 2, an electrochemical hydrogen pump 100 of this embodiment includes an electrolyte membrane 14, a cathode catalyst layer 15, an anode catalyst layer 16, a cathode gas diffusion device 31, an anode gas diffusion device 9, a voltage applicator 19, and a fastener 27.

The cathode gas diffusion device 31 includes a cathode gas diffusion layer 31A and a cathode separator 31B. The anode gas diffusion device 9 includes an anode main body 1 that includes an anode gas diffusion layer 24, an anode gas flow path plate 5, and an anode end plate 10. Specific configurations of the cathode gas diffusion device 31 and the anode gas diffusion device 9 will be described later.

A unit cell 100A of the electrochemical hydrogen pump 100 includes the electrolyte membrane 14, the cathode catalyst layer 15, the anode catalyst layer 16, the cathode gas diffusion device 31, and the anode gas diffusion device 9. Thus, the electrochemical hydrogen pump 100 of FIG. 1 configures a stack in which three tiers of the unit cells 100A are laminated. However, the number of tiers of the unit cells 100A is not limited to this. That is, the number of tiers of the unit cells 100A may be set to a proper number based on operation conditions such as the hydrogen amount of the electrochemical hydrogen pump 100.

The fastener 27 fastens a laminated body 100B of the electrolyte membrane 14, the cathode catalyst layer 15, the anode catalyst layer 16, the cathode gas diffusion layer 31A, and the anode gas diffusion layer 24.

That is, in order to appropriately hold plural unit cells 100A that include the above laminated body 100B in a laminated state, an end surface of the cathode gas diffusion device 31 of the uppermost layer of the unit cells 100A and an end surface of the anode gas diffusion device 9 of the lowermost layer are interposed between an end plate 26U and an end plate 26D via insulating plates or the like, which are not illustrated, and a desired fastening pressure has to be thereby exerted on the unit cells 100A. Thus, the plural fasteners 27 that include a disc spring or the like for exerting the fastening pressure on the unit cells 100A are provided in appropriate positions of the end plate 26U and the end plate 26D.

The fastener 27 may be in any configuration as long as the fastener 27 may fasten the above laminated body 100B. Examples of the fastener 27 may include a bolt that passes through the end plate 26U and the end plate 26D, a nut with a disc spring, and so forth, for example.

The end plate 26U is provided with a cathode gas lead-out pipe 30 through which cathode gas from the cathode gas diffusion device 31 flows. That is, the cathode gas lead-out pipe 30 communicates with a tubular cathode gas lead-out manifold (not illustrated) that is provided to the unit cell 100A in the laminated state. Note that in a planar view, a sealing member such as an O-ring, which is not illustrated, is provided between the cathode gas diffusion device 31 and the anode gas diffusion device 9 so as to surround the cathode gas lead-out manifold, and the cathode gas lead-out manifold is appropriately sealed by the sealing member.

The end plate 26U is also provided with an anode gas lead-out pipe 29 through which excess anode gas from the anode gas diffusion device 9 flows. That is, the anode gas lead-out pipe 29 communicates with a tubular anode gas lead-out manifold 29A that is provided to the unit cell 100A in a laminated state. Note that in a planar view, a sealing member 40 such as an O-ring is provided between the cathode gas diffusion device 31 and the anode gas diffusion device 9 so as to surround the anode gas lead-out manifold 29A, and the anode gas lead-out manifold 29A is appropriately sealed by the sealing member 40.

The end plate 26D is provided with an anode gas introduction pipe 28 through which the anode gas supplied to the anode gas diffusion device 9 flows. That is, the anode gas introduction pipe 28 communicates with a tubular anode gas introduction manifold 28A that is provided to the unit cell 100A in the laminated state. Note that in a planar view, the sealing member 40 such as an O-ring is provided between the cathode gas diffusion device 31 and the anode gas diffusion device 9 so as to surround the anode gas introduction manifold 28A, and the anode gas introduction manifold 28A is appropriately sealed by the sealing member 40.

The electrolyte membrane 14 includes a pair of main surfaces. The electrolyte membrane 14 is a proton-conductive polymer membrane through which protons ($H^+$) are permeable. The electrolyte membrane 14 may be any membrane as long as that is the proton-conductive polymer membrane. For example, as the electrolyte membrane 14, a fluorine-based polymer electrolyte membrane and so forth may be raised. Specifically, for example, Nafion® (DuPont), Aciplex™ (Asahi Kasei Corporation), and so forth may be used.

The cathode catalyst layer 15 is provided on one main surface (for example, the front surface) of the electrolyte membrane 14. Note that in a planar view, a sealing member 41 such as a gasket is provided so as to surround the cathode catalyst layer 15, and the cathode catalyst layer 15 is appropriately sealed by the sealing member 41. The cathode catalyst layer 15 includes platinum as catalyst metal, for example, but embodiments are not limited to this.

The anode catalyst layer 16 is provided on the other main surface (for example, the back surface) of the electrolyte membrane 14. Note that in a planar view, a sealing member 42 such as a gasket is provided so as to surround the anode catalyst layer 16, and the anode catalyst layer 16 is appropriately sealed by the sealing member 42. The anode catalyst layer 16 includes RuIrFeOx as catalyst metal, for example, but embodiments are not limited to this.

Because various methods may be raised as catalyst adjustment methods for the cathode catalyst layer 15 and the anode catalyst layer 16, the adjustment methods are not particularly limited. For example, as carriers of the catalysts, electrically-conductive porous substance powder, carbon-based powder, and so forth may be raised. As the carbon-based powder, for example, powder of graphite, carbon black, activated carbon that is electrically conductive, or the like may be raised. A method for supporting platinum or another catalyst metal on the carrier such as carbon is not particularly limited. For example, a method such as powder mixing or liquid-phase mixing may be used. As the latter liquid-phase mixing, for example, a method in which the carrier such as carbon is dispersed in a catalyst component colloid liquid and adsorption is caused or the like may be raised. Further, using an active oxygen removing agent as the carrier as necessary, platinum or another catalyst metal may be supported by a method similar to the above method. The supported state of the catalyst metal such as platinum on the carrier is not particularly limited. For example, the catalyst metal may be atomized and supported on the carrier in a highly dispersed state.

The voltage applicator 19 applies a voltage between the cathode catalyst layer 15 and the anode catalyst layer 16. The voltage applicator 19 may be in any configuration as long as the voltage applicator 19 may apply a voltage between the cathode catalyst layer 15 and the anode catalyst layer 16. The voltage applicator 19 may be an instrument that adjusts a voltage applied between the cathode catalyst layer 15 and the anode catalyst layer 16. As the voltage applicator 19, for example, a DC/DC converter, an AC/DC converter, or the like may be raised. In this case, the DC/DC converter is used in a case where the voltage applicator 19 is connected with a direct current power source such as a battery, and the AC/DC converter is used in a case where the voltage applicator 19 is connected with an alternating current power source such as commercial power source. Further, a low electrical potential side terminal of the voltage applicator 19 is connected with the electrically conductive cathode gas diffusion device 31, and a high electrical potential side terminal of the voltage applicator 19 is connected with the electrically conductive anode gas diffusion device 9.

Configuration of Cathode Gas Diffusion Device

Figure 3:
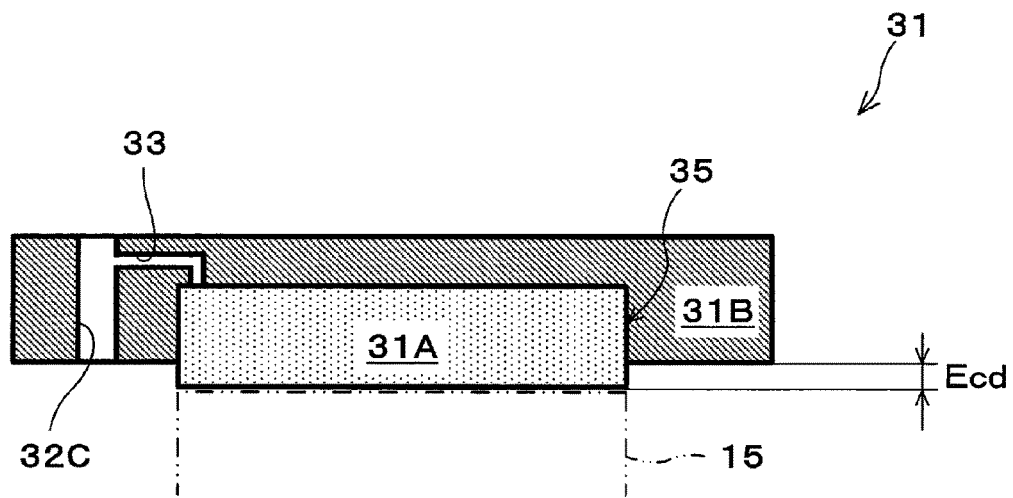
FIG. 3 is a diagram that illustrates one example of a cathode gas diffusion device of the electrochemical hydrogen pump of the first embodiment.

FIG. 3 is a diagram that illustrates one example of a cathode gas diffusion device of the electrochemical hydrogen pump of the first embodiment.

As described above, the cathode gas diffusion device 31 includes the cathode gas diffusion layer 31A and the cathode separator 31B.

The cathode gas diffusion layer 31A is provided on a main surface of the cathode catalyst layer 15, which does not face the electrolyte membrane 14. Further, the cathode gas diffusion layer 31A may be in any configuration as long as the cathode gas diffusion layer 31A includes desired elasticity, desired electrical conductivity, and desired gas permeability. A specific example of the cathode gas diffusion layer 31A will be described in a third example.

In the electrochemical hydrogen pump 100 of this embodiment, the cathode separator 31B includes a recess portion 35 through which the cathode gas lead out from the cathode gas diffusion layer 31A flows.

Further, the cathode gas diffusion layer 31A is accommodated in the recess portion 35 and is disposed to project from the recess portion 35 in the thickness direction thereof before fastening of the laminated body 100B by the fastener 27. A projection amount Ecd of the cathode gas diffusion layer 31A from the recess portion 35 in the thickness direction is a size that is equal to or larger than the total value of the sizes of the respective compressed thicknesses of the anode gas diffusion layer 24, the anode catalyst layer 16, and the electrolyte membrane 14 in a case of an action of the electrochemical hydrogen pump 100.

Note that as described later, this projection amount Ecd may be equivalent to a compression amount Ecd (thickness) of the cathode gas diffusion layer 31A that is compressed by the fastening force of the laminated body 100B.

The cathode separator 31B includes a manifold hole 32C through which the cathode gas flows and a cathode gas flow path 33 that leads out the cathode gas in the recess portion 35 to the manifold hole 32C.

In the cathode gas diffusion device 31 of this embodiment, the cathode gas flow path 33 is configured with a communication hole that causes the manifold hole 32C to communicate with the cathode gas diffusion layer 31A. For example, as illustrated in FIG. 3, this communication hole may extend from a bottom surface of the recess portion 35 to the manifold hole 32C that is formed in the thickness direction of the cathode separator 31B. Further, in a case where the unit cells 100A are laminated, the tubular cathode gas lead-out manifold is formed with a manifold hole 32A (see FIG. 4) provided to the anode gas diffusion device 9 and the manifold hole 32C.

Consequently, the cathode gas may be taken out from the cathode gas diffusion layer 31A in a high pressure state through the cathode gas flow path 33. The cathode gas that passes through the cathode gas flow path 33 flows through the cathode gas lead-out manifold and the cathode gas lead-out pipe 30 in this order.

Configuration of Anode Gas Diffusion Device

Figure 4:
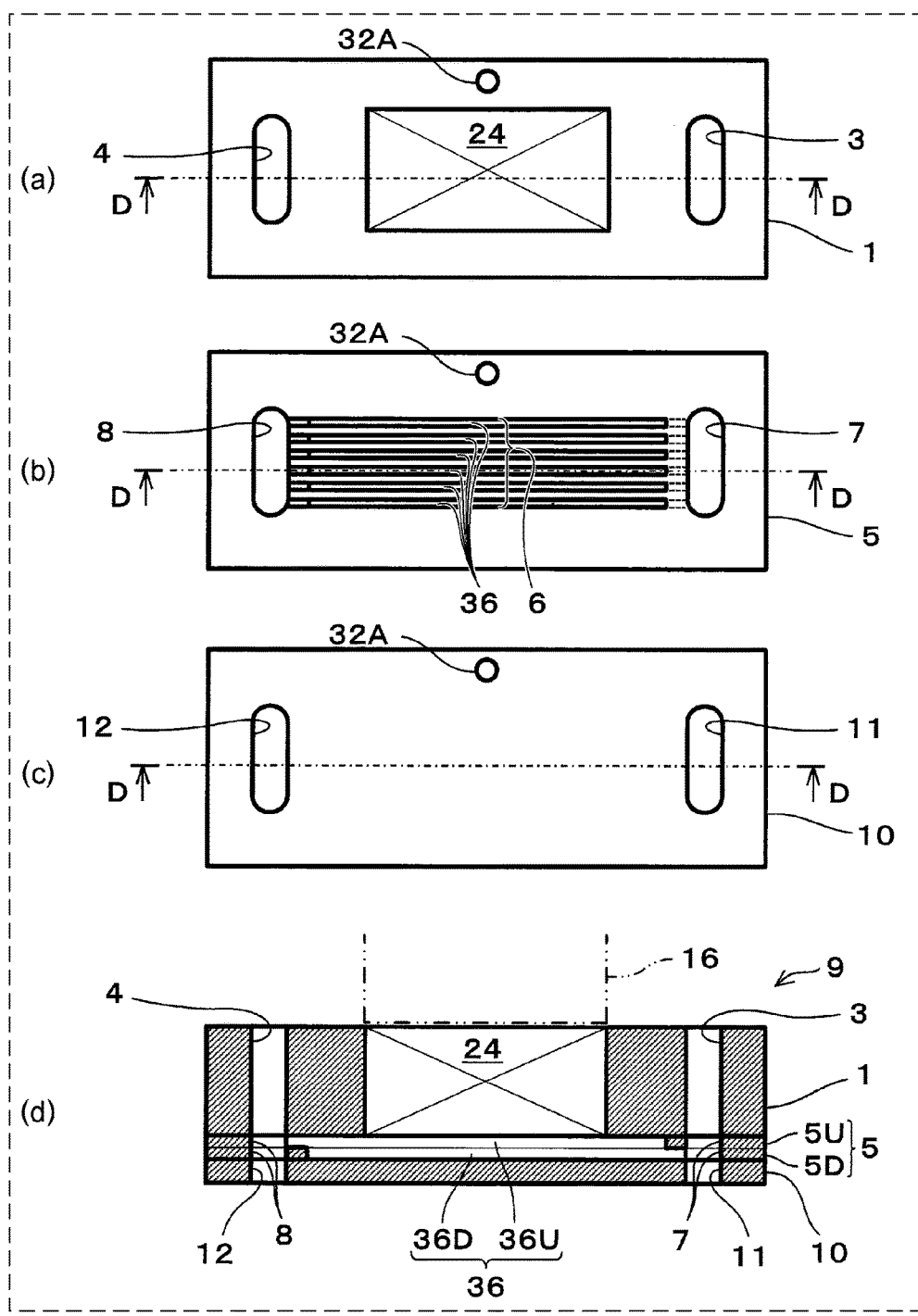
FIG. 4 is a diagram that illustrates one example of an anode gas diffusion device of the electrochemical hydrogen pump of the first embodiment.

FIG. 4 is a diagram that illustrates one example of an anode gas diffusion device of the electrochemical hydrogen pump of the first embodiment. FIG. 4(*a*) is a diagram of the anode main body 1 of the anode gas diffusion device 9 in a planar view. FIG. 4(*b*) is a diagram of the anode gas flow path plate 5 of the anode gas diffusion device 9 in a planar view. FIG. 4(*c*) is a diagram of the anode end plate 10 of the anode gas diffusion device 9 in a planar view.

FIG. 4(*d*) is a cross-sectional diagram of the anode gas diffusion device 9. That is, FIG. 4(*d*) illustrates the cross section of the anode gas diffusion device 9 that corresponds to part D-D in a case where members that are illustrated in FIG. 4(*a*), FIG. 4(*b*), and FIG. 4(*c*) in a planar view are laminated.

As illustrated in FIG. 4(*d*), the anode gas diffusion device 9 includes the anode main body 1, the anode gas flow path plate 5, and the anode end plate 10.

The anode main body 1 is a metallic member that diffuses the anode gas. The anode main body 1 may be in any configuration as long as the anode main body 1 is a metallic member that diffuses the anode gas. The anode main body 1 may be configured with metal such as stainless steel, titanium, a titanium alloy, or an aluminum alloy, for example. The thickness of the anode main body 1 may be approximately several hundred μm (for example, approximately 400 μm). Those materials and values are examples, and embodiments are not limited to those examples.

As illustrated in FIG. 4(*a*) and FIG. 4(*d*), the anode main body 1 includes the anode gas diffusion layer 24, a manifold hole 3 for anode gas introduction, and a manifold hole 4 for leading the anode gas out. Note that the anode gas diffusion layer 24 is configured to be capable of diffusing the anode gas by using a laminated body of metal plates that include through holes, a sintered body of metal powder in a porous structure, or the like.

The anode gas flow path plate 5 is provided on the main surface of the anode main body 1. In the anode gas diffusion device 9 of this embodiment, the anode gas flow path plate 5 is provided to make surface contact with the main surface of the anode main body 1.

As a material of the anode gas flow path plate 5, stainless steel, titanium, a titanium alloy, an aluminum alloy, or the like may be used, for example. The thickness of the anode gas flow path plate 5 may be approximately several ten (for example, approximately 50 μm). Those materials and values are examples, and embodiments are not limited to those examples.

As illustrated in FIG. 4(*b*) and FIG. 4(*d*), the anode gas flow path plate 5 includes a manifold hole 7 for anode gas introduction, a manifold hole 8 for leading anode gas out, and an anode gas flow path 6.

The manifold hole 7 and the manifold hole 8 are arranged to be respectively opposed to the manifold hole 3 and the manifold hole 4 of the anode main body 1.

In the anode gas diffusion device 9 of this embodiment, the anode gas flow path 6 of the anode gas flow path plate 5 is configured with plural slit holes 36D that communicate with the manifold hole 7 and linearly extend toward the manifold hole 8 but do not communicate with the manifold hole 8 and plural slit holes 36U that communicate with the manifold hole 8 and linearly extend toward the manifold hole 7 but do not communicate with the manifold hole 7. That is, the anode gas flow path plate 5 is formed by integrally joining a first metal layer 5D that includes the slit holes 36D and a second metal layer 5U that includes the slit holes 36U such that those slit holes 36D and slit holes 36U overlap with each other. Further, a portion in which the slit holes 36D and the slit holes 36U overlap with each other configures slit holes 36 of the anode gas flow path 6 that passes through the anode gas flow path plate 5. In this case, the manifold hole 7 communicates with a plurality of one ends of the anode gas flow path 6 and is thereby used for anode gas introduction to the anode gas diffusion layer 24. That is, the anode gas that passes through a contact portion between the slit holes 36 of the anode gas flow path 6 and the anode gas diffusion layer 24 is delivered to the anode gas diffusion layer 24. Further, the manifold hole 8 communicates with a plurality of the other ends of the anode gas flow path 6 and is thereby used for leading anode gas out from the anode gas diffusion layer 24.

The anode end plate 10 is provided on the main surface (hereinafter referred to as an opposite surface), which does not face the anode main body 1, of the main surfaces of the anode gas flow path plate 5. Specifically, the plural slit holes 36 of the anode gas flow path plate 5 are covered from the opposite surface by the anode end plate 10.

As a material of the anode end plate 10, stainless steel, titanium, a titanium alloy, an aluminum alloy, or the like may be used, for example. The thickness of the anode end plate 10 may be approximately several ten μm (for example, approximately 50 μm). Those materials and values are examples, and embodiments are not limited to those examples.

Further, the anode end plate 10 includes a manifold hole 11 for anode gas introduction and a manifold hole 12 for leading anode gas out. The manifold hole 11 and the manifold hole 12 of the anode end plate 10 are arranged to be respectively opposed to the manifold hole 7 and the manifold hole 8 of the anode gas flow path plate 5.

Consequently, in a case where the unit cells 100A are laminated, the anode gas introduction manifold 28A is formed with the manifold hole 11, the manifold hole 7, the manifold hole 3, and the manifold hole of the cathode gas diffusion device 31. The anode gas lead-out manifold 29A is formed with the manifold hole 12, the manifold hole 8, the manifold hole 4, and the manifold hole of the cathode gas diffusion device 31.

In the anode gas diffusion device 9 of this embodiment, the anode end plate 10, the anode gas flow path plate 5, and the anode main body 1 may be integrally bonded by metal joining by welding, soldering, deposition, or the like. For example, surface joining by diffusion joining or the like may be performed for the main surface of the anode end plate 10, the main surface of the anode gas flow path plate 5, and a main surface of the anode main body 1. Accordingly, compared to a case where the anode end plate 10, the anode gas flow path plate 5, and the anode main body 1 are laminated by fixing by a mechanical fastening member, gaps do not remain in the respective joining portions, and the contact resistance (electric resistance) of the anode gas diffusion device 9 may thus be reduced. Then, an increase in power consumption requested for the electrochemical hydrogen pump 100 in a case where a desired voltage is applied to the anode gas diffusion device 9 may be inhibited.

Fastening Action of Unit Cell by Fastener

Figure 5:
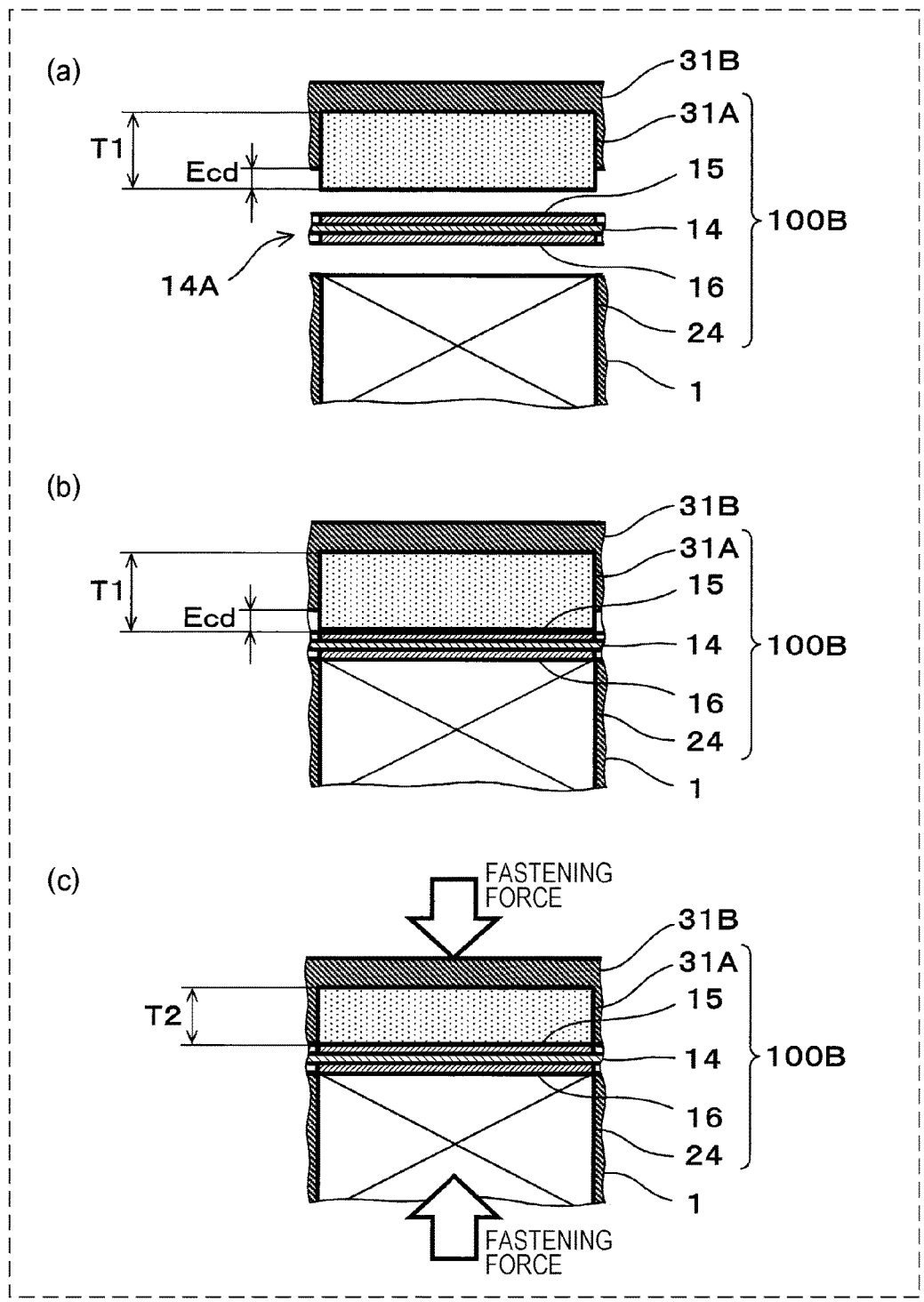
FIG. 5 is a diagram that illustrates one example of a fastening action of a laminated body of the electrochemical hydrogen pump of the first embodiment.

FIG. 5 is a diagram that illustrates one example of a fastening action of a unit cell of the electrochemical hydrogen pump of the first embodiment.

Note that FIG. 5 illustrates cross-sections of the cathode separator 31B, the cathode gas diffusion layer 31A, a member in which the cathode catalyst layer 15 and the anode catalyst layer 16 are respectively coated onto the main surfaces of the electrolyte membrane 14 (hereinafter referred to as an electrolyte membrane (with catalyst layers) 14A), the anode gas diffusion layer 24, and the anode main body 1.

First, as illustrated in FIG. 5(*a*), position adjustment is performed such that the cathode gas diffusion layer 31A is opposed to the electrolyte membrane (with catalyst layers) 14A and the electrolyte membrane (with catalyst layers) 14A is opposed to the anode gas diffusion layer 24.

Next, as illustrated in FIG. 5(*b*), the cathode gas diffusion layer 31A, the electrolyte membrane (with catalyst layers) 14A, and the anode gas diffusion layer 24 are laminated. Here, although the cathode gas diffusion layer 31A, the electrolyte membrane (with catalyst layers) 14A, and the anode gas diffusion layer 24 are brought into contact, the fastening force by the fastener 27 is not exerted. Thus, the gap that is correspondent to the projection amount Ecd in the thickness direction of the cathode gas diffusion layer 31A is formed between the main surface of the cathode separator 31B and the electrolyte membrane (with catalyst layers) 14A.

Next, as illustrated in FIG. 5(*c*), the fastening of the laminated body 100B by the fastener 27 is performed. Then, the cathode gas diffusion layer 31A is compressed by the fastening force of the fastener 27, and the cathode gas diffusion layer 31A, the electrolyte membrane (with catalyst layers) 14A, and the anode gas diffusion layer 24 are brought into tight contact. In this case, the compression amount (thickness) of the cathode gas diffusion layer 31A is equivalent to the above projection amount Ecd. That is, because the gap between the main surface of the cathode separator 31B and the electrolyte membrane (with catalyst layers) 14A does not remain, the value that results from the subtraction of a thickness T2 at a time after compression of the cathode gas diffusion layer 31A from a thickness T1 at a time before the compression of the cathode gas diffusion layer 31A is equivalent to the above projection amount Ecd.

Consequently, the fastening of the unit cell 100A of the electrochemical hydrogen pump 100 at a time before an operation of the electrochemical hydrogen pump 100 is completed.

Action of Electrochemical Hydrogen Pump

In the following, one example of an action (operation) of the electrochemical hydrogen pump 100 of the first embodiment will be described with reference to the drawings.

Note that a portion of or the whole following action may be performed by a control program of a controller, which is not illustrated. The controller may be in any configuration as long as the controller has a control function. The controller includes an arithmetic circuit and a storage circuit that stores the control program, for example. Examples of the arithmetic circuit may include an MPU, a CPU, and so forth, for example. Examples of the storage circuit may include a memory, for example. The controller may be configured with a single controller that performs centralized control or may be configured with plural controllers that mutually and cooperatively perform distributed control.

First, the voltage applicator 19 applies a voltage between the cathode gas diffusion device 31 and the anode gas diffusion device 9.

Next, through the anode gas introduction pipe 28, the anode gas is supplied to the anode gas diffusion device 9. Specifically, the anode gas is supplied from the anode gas introduction pipe 28 to the manifold hole 7 in FIG. 4. Then, because the manifold hole 7 communicates with one ends of the anode gas flow path 6 of the anode gas flow path plate 5, the gas is delivered from the manifold hole 7 to the anode gas flow path 6.

Here, a portion of the anode gas that flows through the anode gas flow path 6 is delivered to the anode gas diffusion layer 24 of the anode main body 1. Because the anode gas diffusion layer 24 includes a gas diffusion function, the anode gas that flows from the anode gas flow path 6 toward the main surface (hereinafter referred to as an opposite surface) of the anode gas diffusion layer 24, which does not face the anode gas flow path plate 5, may pass through the opposite surface while being uniformly diffused by the anode gas diffusion layer 24. Accordingly, the anode gas is uniformly supplied to the anode catalyst layer 16 that is arranged on the opposite surface of the anode gas diffusion layer 24. Note that excess anode gas that does not pass through the above opposite surface is delivered to the manifold hole 8 that communicates with the other ends of the anode gas flow path 6 of the anode gas flow path plate 5 and is discharged to the anode gas lead-out pipe 29. As the anode gas, for example, reformed gas containing hydrogen, hydrogen-containing gas that is generated by water electrolysis, or the like may be raised.

Consequently, hydrogen in the anode gas liberates an electron on the anode catalyst layer 16 and becomes a proton ($H^+$) (formula (1)). The liberated electron moves to the cathode catalyst layer 15 via the voltage applicator 19.

Meanwhile, a proton permeates the inside of the electrolyte membrane 14 while accompanying a water molecule and moves to the cathode catalyst layer 15. In the cathode catalyst layer 15, the reduction reaction of the proton that permeates the electrolyte membrane 14 and an electron takes place, and the cathode gas (hydrogen gas) is thereby generated (formula (2)).

Accordingly, purification of hydrogen gas is highly efficiently performed from the hydrogen gas (anode gas) that contains impurities such as $CO_2$ gas. Note that the anode gas may contain CO gas as an impurity. In this case, because CO gas lowers catalyst activities of the anode catalyst layer 16 and so forth, it is desirable that CO gas is removed by a CO remover (for example, a transformer, a CO selective oxidizer, or the like), which is not illustrated.

Then, a pressure drop of the cathode gas lead-out pipe 30 is increased, a voltage E of the voltage applicator 19 is raised, and a gas pressure P2 of a cathode thereby becomes a high pressure. Specifically, the relationship among a gas pressure P1 of an anode, a gas pressure P2 of a cathode, and the voltage E of the voltage applicator 19 is formulated by the following formula (3).

Anode: $H_2$ (low pressure)$\rightarrow 2H^+ + 2e^-$     (1)

Cathode: $2H^+ + 2e^- \rightarrow H_2$ (high pressure)     (2)

$E = (RT/2F)\ln(P2/P1) + ir$     (3)

In formula (3), R represents the gas constant (8.3145 J/K·mol), T represents a temperature (K), F represents the Faraday constant (96485 C/mol), P2 represents the gas pressure of the cathode, P1 represents the gas pressure of the anode, i represents current density ($A/cm^2$), and r represents a cell resistance ($\Omega \cdot cm^2$).

It may easily be understood from formula (3) that the voltage E of the voltage applicator 19 is raised and the gas pressure P2 of the cathode may thereby be caused to rise. Note that the pressure drop of the cathode gas lead-out pipe 30 may be increased or decreased in accordance with the opening degree of a switch valve that is provided to the cathode gas lead-out pipe 30, for example.

Then, in a case where the gas pressure of the cathode gas diffusion device 31 becomes a prescribed value or higher, the pressure drop of the cathode gas lead-out pipe 30 is decreased (for example, the opening degree of the switch valve is made higher), and the cathode gas of the cathode gas diffusion device 31 is thereby filled in a high-pressure hydrogen tank, which is not illustrated, through the cathode gas lead-out pipe 30. On the other hand, in a case where the gas pressure of the cathode gas diffusion device 31 becomes lower than a prescribed pressure, the pressure drop of the cathode gas lead-out pipe 30 is increased (for example, the opening degree of the switch valve is made lower), and the cathode gas diffusion device 31 is thereby disconnected from the high-pressure hydrogen tank. Accordingly, the reverse flow of the cathode gas of the high-pressure hydrogen tank to the cathode gas diffusion device 31 is inhibited.

In such a manner, the cathode gas (hydrogen gas) of high purity is pressurized to a desired target pressure and is filled in the high-pressure hydrogen tank by the electrochemical hydrogen pump 100.

In the above pressurization action of the cathode gas, the gas pressure P2 of the cathode becomes a high pressure, and the electrolyte membrane 14, the anode catalyst layer 16, and the anode gas diffusion layer 24 are pressed. Then, each of the electrolyte membrane 14, the anode catalyst layer 16, and the anode gas diffusion layer 24 is compressed by this pressing. Accordingly, given that the compressed thickness of the electrolyte membrane 14 is Em, the compressed thickness of the anode catalyst layer 16 is Eac, and the compressed thickness of the anode gas diffusion layer 24 is Ead, the total value Eat of the compressed thicknesses of those is expressed by the following formula (4).

$Em + Eac + Ead = Eat$     (4)

Here, in a case where the tightness of contact between the cathode catalyst layer 15 and the cathode gas diffusion layer 31A is high, for example, even in a case where the total value Eat of formula (4) increases, a gap is not likely to occur between both of those. On the other hand, in a case where the tightness of contact between the cathode catalyst layer 15 and the cathode gas diffusion layer 31A is low, the gap is likely to occur between both of those. Hypothetically, in a case where the gap occurs between the cathode catalyst layer 15 and the cathode gas diffusion layer 31A, the contact resistance between both of those increases. Then, because the voltage E applied by the voltage applicator 19 increases, the operation efficiency of the electrochemical hydrogen pump 100 may be lowered.

Accordingly, in the electrochemical hydrogen pump 100 of this embodiment, as illustrated in FIG. 3, the cathode gas diffusion layer 31A is configured to project by the projection amount Ecd in the thickness direction from the recess portion 35 of the cathode separator 31B before the fastening of the laminated body 100B by the fastener 27. Further, as illustrated in FIG. 5(c), the cathode gas diffusion layer 31A is compressed by the projection amount Ecd by the fastener 27 during the fastening of the laminated body 100B.

Further, the above projection amount Ecd (the compressed thickness of the cathode gas diffusion layer 31A) is set such that the relationship expressed by the following formula (5) holds between the projection amount Ecd and the total value Eat of formula (4).

That is, the thickness T1 of the cathode gas diffusion layer 31A at a time before the fastening of the laminated body 100B is set such that the size of the compressed thickness of the cathode gas diffusion layer 31A (in this example, the projection amount Ecd) in a case of the fastening of the laminated body 100B is equal to or larger than the total value Eat of the sizes of the respective compressed thicknesses of the anode gas diffusion layer 24, the anode catalyst layer 16, and the electrolyte membrane 14 in a case of the action of the electrochemical hydrogen pump 100.

$$Ecd \geq Em + Eac + Ead = Eat \quad (5)$$

Consequently, the electrochemical hydrogen pump 100 of this embodiment may simply and appropriately inhibit an increase in the contact resistance between the cathode catalyst layer 15 and the cathode gas diffusion layer 31A compared to related art.

Specifically, in a case where the cathode gas of the electrochemical hydrogen pump 100 becomes a high pressure state in a case of the action of the electrochemical hydrogen pump 100, the cathode gas may not pass through the electrolyte membrane 14, and a high pressure is thus exerted on the electrolyte membrane 14, the anode catalyst layer 16, and the anode gas diffusion layer 24. Then, each of the electrolyte membrane 14, the anode catalyst layer 16, and the anode gas diffusion layer 24 is compressed and deformed. However, here, in the electrochemical hydrogen pump 100 of this embodiment, the cathode gas diffusion layer 31A elastically deforms in the direction in which the cathode gas diffusion layer 31A is recovered from the compressed thickness T2 by the fastener 27 to the uncompressed and original thickness T1, and the contact between the cathode catalyst layer 15 and the cathode gas diffusion layer 31A may thereby be maintained appropriately. Thus, because a dedicated member for pressing the cathode gas diffusion layer 31A to the cathode catalyst layer 15 is not requested, the above increase in the contact resistance may be inhibited by a simpler configuration than the techniques disclosed in Japanese Unexamined Patent Application Publication No. 2006-70322.

Further, the size of the compressed thickness of the cathode gas diffusion layer 31A in a case of the fastening of the laminated body 100B is decided in consideration of the total value Eat of the sizes of the respective compressed thicknesses of the anode gas diffusion layer 24, the anode catalyst layer 16, and the electrolyte membrane 14 in a case of the action of the electrochemical hydrogen pump 100. Thus, the above increase in the contact resistance may be inhibited more appropriately than the techniques disclosed in Japanese Unexamined Patent Application Publication No. 2006-111924.

In such a manner, the electrochemical hydrogen pump 100 of this embodiment may inhibit the increase in the voltage E applied by the voltage applicator 19 and may further inhibit lowering of the operation efficiency of the electrochemical hydrogen pump 100. Thus, a stable operation of the electrochemical hydrogen pump 100 may be performed.

Note that a compression amount Em (thickness) of the electrolyte membrane 14, a compression amount Eac (thickness) of the anode catalyst layer 16, and a compression amount Ead (thickness) of the anode gas diffusion layer 24 change in accordance with configuration materials, initial thicknesses at a time before compression and deformation, and so forth of those. Thus, it may be better to in advance estimate the projection amount Ecd of the cathode gas diffusion layer 31A with respect to each of the configuration materials and initial thicknesses of the electrolyte membrane 14, the anode catalyst layer 16, and the anode gas diffusion layer 24.

Further, the above values also change in accordance with the magnitude of the gas pressure P2 of the cathode in a case of the operation of the electrochemical hydrogen pump 100. Thus, it may be better to set the projection amount Ecd while the maximum value of the gas pressure P2 of the cathode in a case of the operation of the electrochemical hydrogen pump 100 is used as a standard.

Further, the fastening force of the laminated body 100B has to exercise a compression force for compressing the cathode gas diffusion layer 31A by at least the projection amount Ecd. However, it may be better to set the fastening force in consideration of the pressure requested for sustaining gas sealing for the anode gas introduction manifold 28A, the anode gas lead-out manifold 29A, and the cathode gas lead-out manifold and gas sealing for the electrolyte membrane (with catalyst layers) 14A.

First Example

As for the electrochemical hydrogen pump 100 of a first example of the first embodiment, in the electrochemical hydrogen pump 100 of the first embodiment, the cathode gas diffusion layer 31A has higher rigidity on the side that faces the cathode separator 31B than the side that corresponds to the cathode catalyst layer 15.

The fastening force of the laminated body 100B is exerted on the cathode gas diffusion layer 31A through the above cathode separator 31B. Thus, the rigidity of the cathode gas diffusion layer 31A on the side that faces the cathode separator 31B is made higher than that on the side that corresponds to the cathode catalyst layer 15, and it is thereby possible that the fastening force is uniformly exerted on the cathode gas diffusion layer 31A compared to the opposite case. Thus, because the cathode gas diffusion layer 31A and the cathode catalyst layer 15 may be brought into contact at a uniform pressure, the increase in the contact resistance between the cathode catalyst layer 15 and the cathode gas diffusion layer 31A may be inhibited further effectively.

Note that in a case where the cathode gas diffusion layer 31A is configured with a sintered metal fiber body in a non-woven fabric form, for example, the increase and decrease in the rigidity of the cathode gas diffusion layer 31A may be adjusted by the density of the sintered metal fiber body. That is, in the electrochemical hydrogen pump 100 of this example, the density of the sintered metal fiber body on the side that faces the cathode separator 31B is higher than the density of the sintered metal fiber body on the side that corresponds to the cathode catalyst layer 15.

The rigidity, which is mentioned here, is correspondent to the flexural rigidity of the cathode gas diffusion layer 31A. This flexural rigidity may be known by measuring the Young's modulus of the cathode gas diffusion layer 31A by a static test method (bending test), a transverse vibration method, an ultrasonic method, or the like.

Except for the above features, the electrochemical hydrogen pump 100 of this example may be configured similarly to the electrochemical hydrogen pump 100 of the first embodiment.

Second Example

As for the electrochemical hydrogen pump of a second example of the first embodiment, in the electrochemical hydrogen pump 100 of the first embodiment, the cathode gas diffusion layer 31A has higher porosity on the side that faces the cathode catalyst layer 15 than the side that corresponds to the cathode separator 31B.

As the porosity of the cathode gas diffusion layer 31A becomes higher, the gas permeability of the cathode gas diffusion layer 31A becomes higher. Thus, in a case where the porosity of the cathode gas diffusion layer 31A on the side that faces the cathode catalyst layer 15 is higher, the cathode gas is easily drawn from the cathode catalyst layer 15 into the cathode gas diffusion layer 31A compared to the opposite case.

Further, as the porosity of the cathode gas diffusion layer 31A becomes higher, the cathode gas diffusion layer 31A is more easily crushed. Thus, in a case where the porosity of the cathode gas diffusion layer 31A on the side that faces the cathode catalyst layer 15 is higher, the tightness of contact between the cathode catalyst layer 15 and the cathode gas diffusion layer 31A may be improved compared to the opposite case.

Note that in a case where the cathode gas diffusion layer 31A is configured with the sintered metal fiber body in a non-woven fabric form, for example, the increase and decrease in the porosity of the cathode gas diffusion layer 31A may be adjusted by the density of the sintered metal fiber body. That is, in the electrochemical hydrogen pump 100 of this example, the density of the sintered metal fiber body on the side that corresponds to the cathode catalyst layer 15 is lower than the density of the sintered metal fiber body on the side that faces the cathode separator 31B.

The porosity of the cathode gas diffusion layer 31A may be represented by air permeability that may be measured by a Gurley tester method or the like, for example.

Except for the above features, the electrochemical hydrogen pump 100 of this example may be configured similarly to the electrochemical hydrogen pump 100 of the first embodiment.

Third Example

As for the electrochemical hydrogen pump 100 of the third example of the first embodiment, in the electrochemical hydrogen pump 100 of any of the first embodiment and the first example and the second example of the first embodiment, the cathode gas diffusion layer 31A is configured with a sintered body of metal fiber. The cathode gas diffusion layer 31A is configured with the sintered body of metal fiber, and it thereby becomes easy to secure elasticity and gas permeability that are requested for the cathode gas diffusion layer 31A compared to a case where the cathode gas diffusion layer 31A is configured with a metal steel plate provided with plural vent holes.

For example, the cathode gas diffusion layer 31A has to be an elastic body that is recovered from the compressed thickness T2 by the fastening force of the fastener 27 to the uncompressed and original thickness T1. Further, in view of reduction in the contact resistance between the cathode catalyst layer 15 and the cathode gas diffusion layer 31A, it is better for the cathode gas diffusion layer 31A to have high electrical conductivity.

Accordingly, in the electrochemical hydrogen pump 100 of this example, the cathode gas diffusion layer 31A may be configured with a sintered body of metal fiber, which is a sintered body of titanium fiber in a non-woven fabric form and applying platinum plating to the surface thereof, for example.

In the sintered metal fiber body in a non-woven fabric form, the metal fibers are configured in a three-dimensional manner, and mutual connection points are sintered. Accordingly, the electrical conductivity of this sintered metal fiber body is high. Further, because the metal fibers are configured in a three-dimensional manner, the gas dispersion performance of this sintered metal fiber body is high.

Note that for example, a material that is configured with graphitized carbon fiber, is carbon particles which are coated with an ionically conductive resin, kneaded into a rubber form, and processed into a sheet shape, has elasticity like the above sintered metal fiber body in a non-woven fabric form, and has high electrical conductivity may be used as a cathode gas diffusion layer.

Further, for the cathode gas diffusion layer 31A, it is better to use a material in which the change in the electrical conductivity of the cathode gas diffusion layer 31A is small with respect to the compression amount (thickness). For example, as the compression amount (thickness) of the cathode gas diffusion layer 31A becomes larger, the intervals among configuration members of the cathode gas diffusion layer 31A become shorter. Further, the contact areas among the configuration members of the cathode gas diffusion layer 31A increase. Thus, as the compression amount (thickness) of the cathode gas diffusion layer 31A becomes larger, the electric resistance of the cathode gas diffusion layer 31A tends to become lower.

Here, the compression amount (thickness) of the cathode gas diffusion layer 31A is different between a case where the electrochemical hydrogen pump 100 operates and a case where the operation stops. Further, in the operation of the electrochemical hydrogen pump 100, the gas pressure P2 of the cathode of the electrochemical hydrogen pump 100 changes from a low pressure to a high pressure. Then, the compression amount (thickness) of the cathode gas diffusion layer 31A also changes. Thus, as described above, for the stable operation of the electrochemical hydrogen pump 100, it is better to use a material, in which the change in the electric resistance (electrical conductivity) of the cathode gas diffusion layer 31A is small with respect to the change in the compression amount (thickness), for the cathode gas diffusion layer 31A.

Except for the above features, the electrochemical hydrogen pump 100 of this example may be configured similarly to the electrochemical hydrogen pump 100 of any of the first embodiment and the first example and the second example of the first embodiment.

First Modification Example

Figure 6:
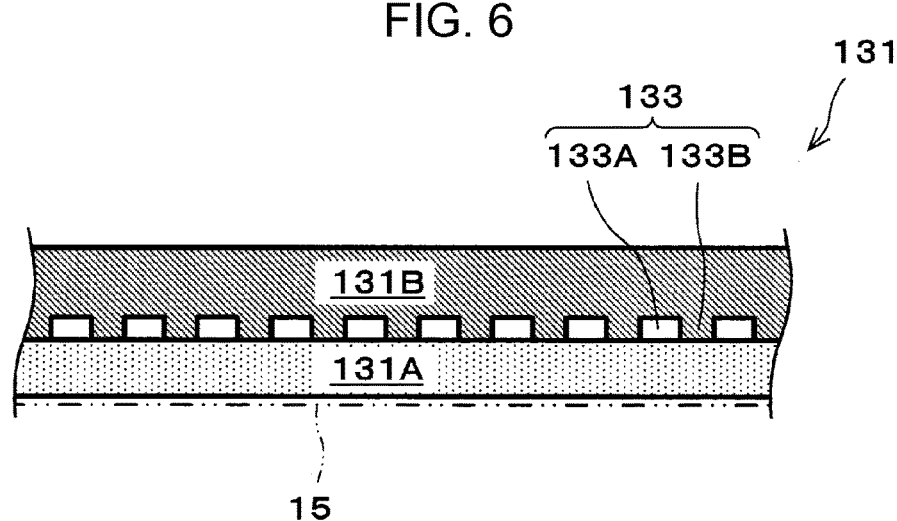
FIG. 6 is a diagram that illustrates one example of a cathode gas diffusion device of the electrochemical hydrogen pump of a first modification example of the first embodiment.

FIG. 6 is a diagram that illustrates one example of a cathode gas diffusion device of the electrochemical hydrogen pump of a first modification example of the first embodiment.

As illustrated in FIG. 6, a cathode gas diffusion device 131 includes a cathode gas diffusion layer 131A and a cathode separator 131B. The cathode gas diffusion layer 131A is similar to the cathode gas diffusion layer 31A of the first embodiment, and a description will thus not be made.

In the electrochemical hydrogen pump 100 of the first embodiment, a description is made about an example where the cathode separator 31B includes the recess portion 35 through which the cathode gas led out from the cathode gas diffusion layer 31A flows. However, a configuration of a cathode separator is not limited to this.

In the electrochemical hydrogen pump 100 of this modification example, the cathode separator 131B includes a manifold hole, which is not illustrated, and a cathode gas flow path 133 that communicates with this manifold hole.

The cathode gas flow path 133 is configured with a groove portion 133A and a rib 133B that are formed on a main surface of the cathode separator 131B. Note that in a case where the unit cells 100A are laminated, the tubular cathode gas lead-out manifold is formed with the manifold hole 32A (see FIG. 4) provided to the anode gas diffusion device 9 and the manifold hole of the cathode separator 131B, which is not illustrated.

Accordingly, the cathode gas may be taken out from the cathode gas diffusion layer 131A in a high pressure state through the groove portion 133A of the cathode gas flow path 133. The cathode gas that passes through the groove portion 133A flows through the cathode gas lead-out manifold and the cathode gas lead-out pipe 30 in this order.

Except for the above features, the electrochemical hydrogen pump 100 of this modification example may be configured similarly to the electrochemical hydrogen pump 100 of any of the first embodiment and the first example to the third example of the first embodiment.

Second Modification Example

Figure 7:
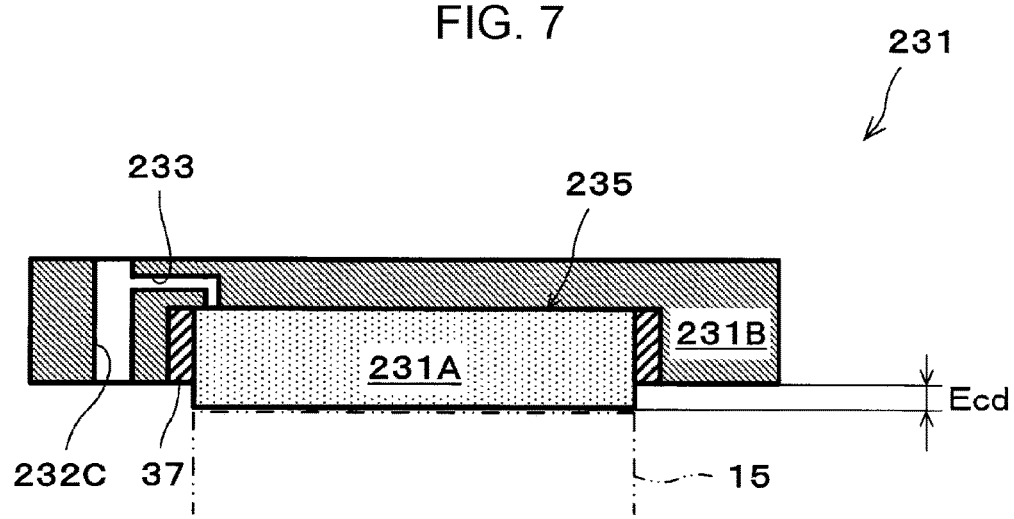
FIG. 7 is a diagram that illustrates one example of a cathode gas diffusion device of the electrochemical hydrogen pump of a second modification example of the first embodiment.

FIG. 7 is a diagram that illustrates one example of a cathode gas diffusion device of the electrochemical hydrogen pump of a second modification example of the first embodiment.

As illustrated in FIG. 7, a cathode gas diffusion device 231 includes a cathode gas diffusion layer 231A, a cathode separator 231B, and an elastic member 37. The cathode separator 231B includes a recess portion 235 through which the cathode gas led out from the cathode gas diffusion layer 231A flows. Note that the cathode gas diffusion layer 231A is similar to the cathode gas diffusion layer 31A of the first embodiment, and a description will thus not be made.

The elastic member 37 is provided between a side surface of the cathode gas diffusion layer 231A and a side surface of the recess portion 235 of the cathode separator 231B.

For example, the elastic member 37 may be formed into an annular shape (for example, a rectangularly annular shape or a circularly annular shape) along a side surface of the cathode gas diffusion layer 231A in an annular shape (for example, a rectangularly annular shape or a circularly annular shape) in a planar view of the cathode gas diffusion device 231. Further, the dimension of the elastic member 37 in the central axis direction may be shorter than the thickness of the cathode gas diffusion layer 231A. For example, the dimension of the elastic member 37 in the central axis direction may be substantially the same as the depth of the recess portion 235 of the cathode separator 231B as illustrated in FIG. 7.

The cathode separator 231B includes a manifold hole 232C through which the cathode gas flows and a cathode gas flow path 233 that leads out the cathode gas in the recess portion 235 to the manifold hole 232C.

In the cathode gas diffusion device 231 of this modification example, the cathode gas flow path 233 is configured with a communication hole that causes the manifold hole 232C to communicate with the cathode gas diffusion layer 231A. For example, as illustrated in FIG. 7, this communication hole may extend from a bottom surface of the recess portion 235, which is not provided with the elastic member 37, to the manifold hole 232C that is formed in the thickness direction of the cathode separator 231B. Further, in a case where the unit cells 100A are laminated, the tubular cathode gas lead-out manifold is formed with the manifold hole 32A (see FIG. 4) provided to the anode gas diffusion device 9 and the manifold hole 232C.

Consequently, the cathode gas may be taken out from the cathode gas diffusion layer 231A in a high pressure state through the cathode gas flow path 233 of the cathode separator 231B. The cathode gas that passes through the cathode gas flow path 233 flows through the cathode gas lead-out manifold and the cathode gas lead-out pipe 30 in this order.

In such a manner, the electrochemical hydrogen pump 100 of this modification example may simply and appropriately inhibit an increase in a contact resistance between the cathode catalyst layer 15 and the cathode gas diffusion layer 231A compared to related art.

Specifically, in a case where the cathode gas diffusion layer 231A projects from the recess portion 235 before the fastening, a main surface of the cathode gas diffusion layer 231A tightly contacts with the main surface of the cathode catalyst layer 15 in the fastening, and the cathode gas diffusion layer 231A is thereby compressed by the fastening pressure in the vertical direction to the main surface (thickness direction) but is stretched in the parallel direction with this main surface. Then, hypothetically, in a case where the elastic member 37 is not provided between the side surface of the cathode gas diffusion layer 231A and the side surface of the recess portion 235, the cathode gas diffusion layer 231A projects from the recess portion 235 in a periphery of the recess portion 235 of the cathode separator 231B, and this projecting portion possibly causes damage to the cathode catalyst layer 15 or the electrolyte membrane 14.

However, in the electrochemical hydrogen pump 100 of this modification example, as illustrated in FIG. 7, the elastic member 37 is provided between the side surface of the cathode gas diffusion layer 231A and the side surface of the recess portion 235, the stretch of the cathode gas diffusion layer 231A in the parallel direction with the main surface of the cathode gas diffusion layer 231A is thereby absorbed, and the possibility that the cathode gas diffusion layer 231A projects from the recess portion 235 in the periphery of the recess portion 235 may thereby be reduced.

The elastic member 37 may be any member as long as the elastic member 37 is a member that may absorb the stretch of the cathode gas diffusion layer 231A in the parallel direction with the main surface of the cathode gas diffusion layer 231A. For example, the elastic member 37 is configured with a material whose rigidity is lower than the cathode gas diffusion layer 231A. As a material of the elastic member 37, rubber, a porous resin, or the like may be used, for example. However, embodiments are not limited to these.

Note that the above elastic member 37 may be provided to the electrochemical hydrogen pump 100 of any of the first embodiment, the first example to the third example of the first embodiment, and the first modification example of the first embodiment. That is, except for the above features, the electrochemical hydrogen pump 100 of this modification example may be configured similarly to the electrochemical hydrogen pump 100 of any of the first embodiment, the first example to the third example of the first embodiment, and the first modification example of the first embodiment.

Second Embodiment

General Configuration of Apparatus

Figure 8:
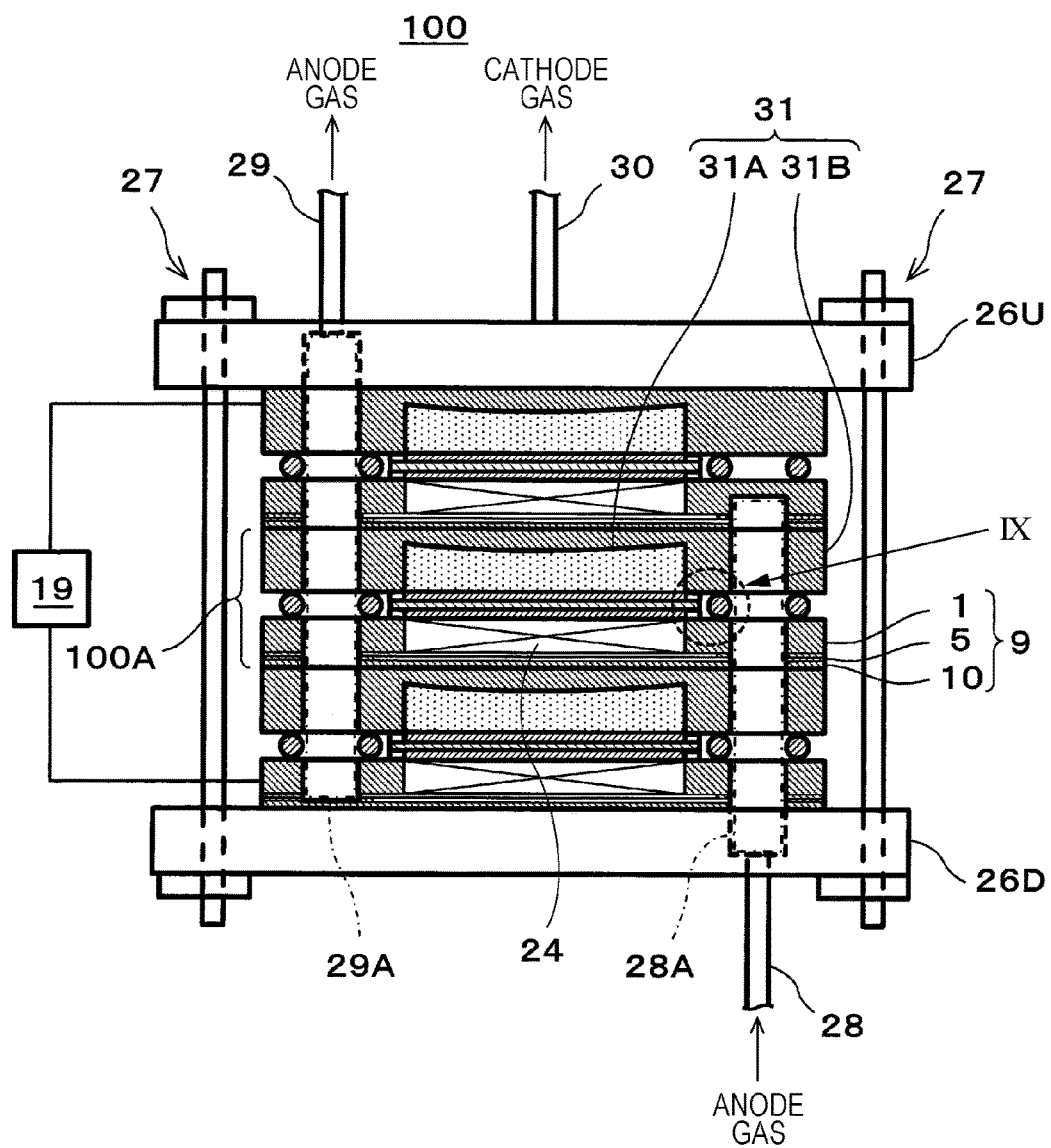
FIG. 8 is a diagram that illustrates one example of an electrochemical hydrogen pump of a second embodiment.
Figure 9:
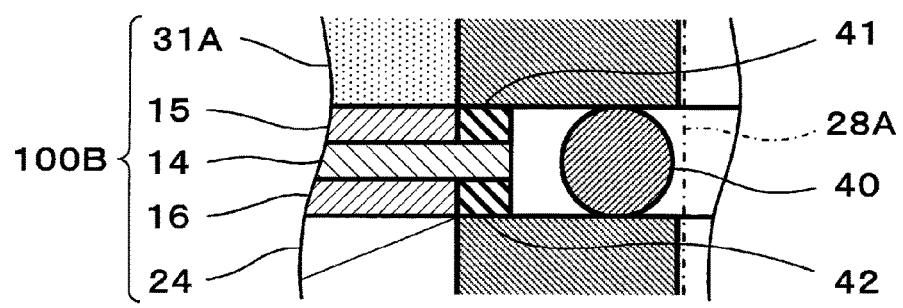
FIG. 9 is a diagram that illustrates one example of the electrochemical hydrogen pump of the second embodiment.

FIG. 8 and FIG. 9 are diagrams that illustrate examples of an electrochemical hydrogen pump of a second embodiment. FIG. 9 is an enlarged diagram of part IX in FIG. 8.

As illustrated in FIG. 8 and FIG. 9, the electrochemical hydrogen pump 100 of this embodiment includes the electrolyte membrane 14, the cathode catalyst layer 15, the anode catalyst layer 16, the cathode gas diffusion device 31, the anode gas diffusion device 9, the voltage applicator 19, and the fastener 27.

The cathode gas diffusion device 31 includes the cathode gas diffusion layer 31A and the cathode separator 31B. The anode gas diffusion device 9 includes the anode main body 1 that includes the anode gas diffusion layer 24, the anode gas flow path plate 5, and the anode end plate 10.

The unit cell 100A of the electrochemical hydrogen pump 100 includes the electrolyte membrane 14, the cathode catalyst layer 15, the anode catalyst layer 16, the cathode gas diffusion device 31, and the anode gas diffusion device 9. Thus, the electrochemical hydrogen pump 100 of FIG. 8 configures a stack in which three tiers of the unit cells 100A are laminated. However, the number of tiers of the unit cells 100A is not limited to this. That is, the number of tiers of the unit cells 100A may be set to a proper number based on operation conditions such as the hydrogen amount of the electrochemical hydrogen pump 100.

The fastener 27 fastens the laminated body 100B of the electrolyte membrane 14, the cathode catalyst layer 15, the anode catalyst layer 16, the cathode gas diffusion layer 31A, and the anode gas diffusion layer 24.

Note that a specific configuration of the laminated body 100B of the electrochemical hydrogen pump 100 of this embodiment, a fastening configuration of the unit cells 100A, a piping configuration for the anode gas and cathode gas, the voltage applicator 19, and so forth are similar to the configuration of the electrochemical hydrogen pump 100 of the first embodiment, and a description will thus not be made.

Configuration of Cathode Gas Diffusion Device

Figure 10:
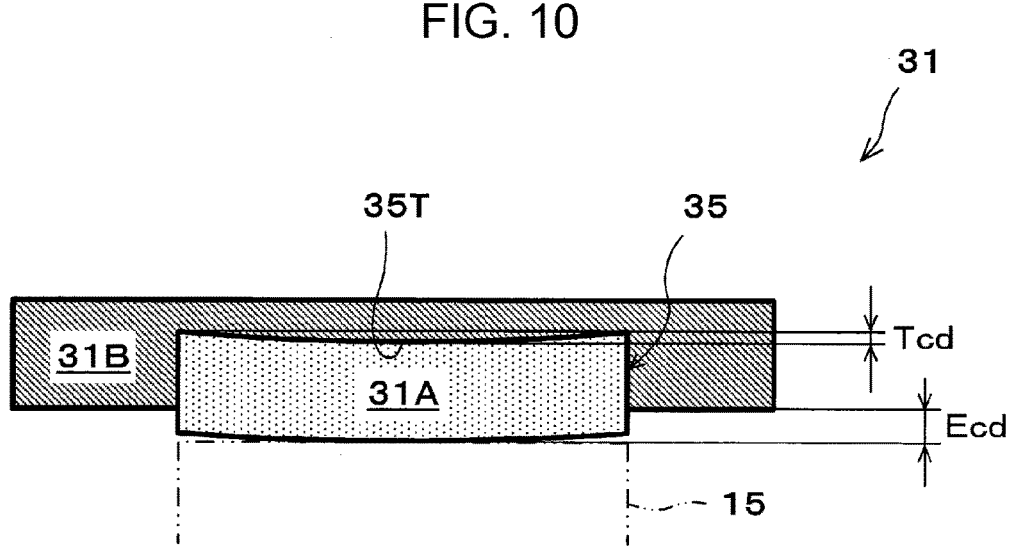
FIG. 10 is a diagram that illustrates one example of a cathode gas diffusion device of the electrochemical hydrogen pump of the second embodiment.

FIG. 10 is a diagram that illustrates one example of a cathode gas diffusion device of the electrochemical hydrogen pump of the second embodiment.

As described above, the cathode gas diffusion device 31 includes the cathode gas diffusion layer 31A and the cathode separator 31B.

The cathode gas diffusion layer 31A is provided on a main surface of the cathode catalyst layer 15, which does not face the electrolyte membrane 14. Further, the cathode gas diffusion layer 31A may be in any configuration as long as the cathode gas diffusion layer 31A includes desired elasticity, desired electrical conductivity, and desired gas permeability. A specific example of the cathode gas diffusion layer 31A will be described in a fifth example.

In the electrochemical hydrogen pump 100 of this embodiment, the cathode separator 31B includes the recess portion 35 through which the cathode gas lead out from the cathode gas diffusion layer 31A flows.

Further, the recess portion 35 is not provided with a partition portion (rib) for partitioning the flow of the cathode gas in the recess portion 35. In a case where the cathode gas diffusion layer 31A is accommodated in the recess portion 35, almost the whole area of a main surface of the cathode gas diffusion layer 31A contacts with the bottom surface of the recess portion 35.

Here, the bottom surface of the recess portion 35 of the cathode separator 31B includes a protrusion portion 35T that does not partition the flow of the cathode gas. The bottom surface of the recess portion 35 may be in any configuration as long as the bottom surface includes the protrusion portion 35T that does not partition the flow of the cathode gas. For example, the protrusion portion 35T may be provided such that the center of the bottom surface of the recess portion 35 becomes highest. In this case, the protrusion portion 35T may be configured to swell from a peripheral portion of the bottom surface of the recess portion 35 to a distance Tcd in the perpendicular direction in a curved surface shape (bowl shape). Processing of the curved surface of such a protrusion portion 35T may be performed by machining of the bottom surface of the recess portion 35 of the cathode separator 31B, for example. Note that instead of the processing of the curved surface of the protrusion portion 35T, plural thin metal membranes whose areas gradually become smaller may be laminated, and a protrusion portion may thereby be formed. In this case, although steps for the thickness of the thin metal membranes occur, the distance Tcd of the protrusion portion may easily be adjusted by the thickness of the thin metal membrane. Further, compared to fine machining processing of the recess portion 35 of the cathode separator 31B, the protrusion portion may simply be formed only by laminating the thin metal membranes.

The cathode gas diffusion layer 31A is accommodated in the recess portion 35 and is disposed to project from the recess portion 35 in the thickness direction thereof before fastening of the laminated body 100B by the fastener 27. Here, because the cathode gas diffusion layer 31A is configured with an elastic material, the main surface of the cathode gas diffusion layer 31A that faces the protrusion portion 35T elastically deforms along the shape of the protrusion portion 35T from a flat surface. Then, a main surface of the cathode gas diffusion layer 31A on the opposite side that does not face the protrusion portion 35T also elastically deforms from a flat surface into a similar shape to the protrusion portion 35T and protrudes in the perpendicular direction.

Here, in a central portion of the cathode gas diffusion layer 31A, the projection amount Ecd of the cathode gas diffusion layer 31A from the recess portion 35 in the thickness direction is a size that is equal to or larger than the total value of the sizes of the respective compressed thicknesses of the anode gas diffusion layer 24, the anode catalyst layer 16, and the electrolyte membrane 14 in a case of the action of the electrochemical hydrogen pump 100.

Note that as described later, this projection amount Ecd may be equivalent to the compression amount Ecd (thickness) of the central portion of the cathode gas diffusion layer 31A that is compressed by the fastening force of the laminated body 100B.

Configuration of Anode Gas Diffusion Device

Figure 11:
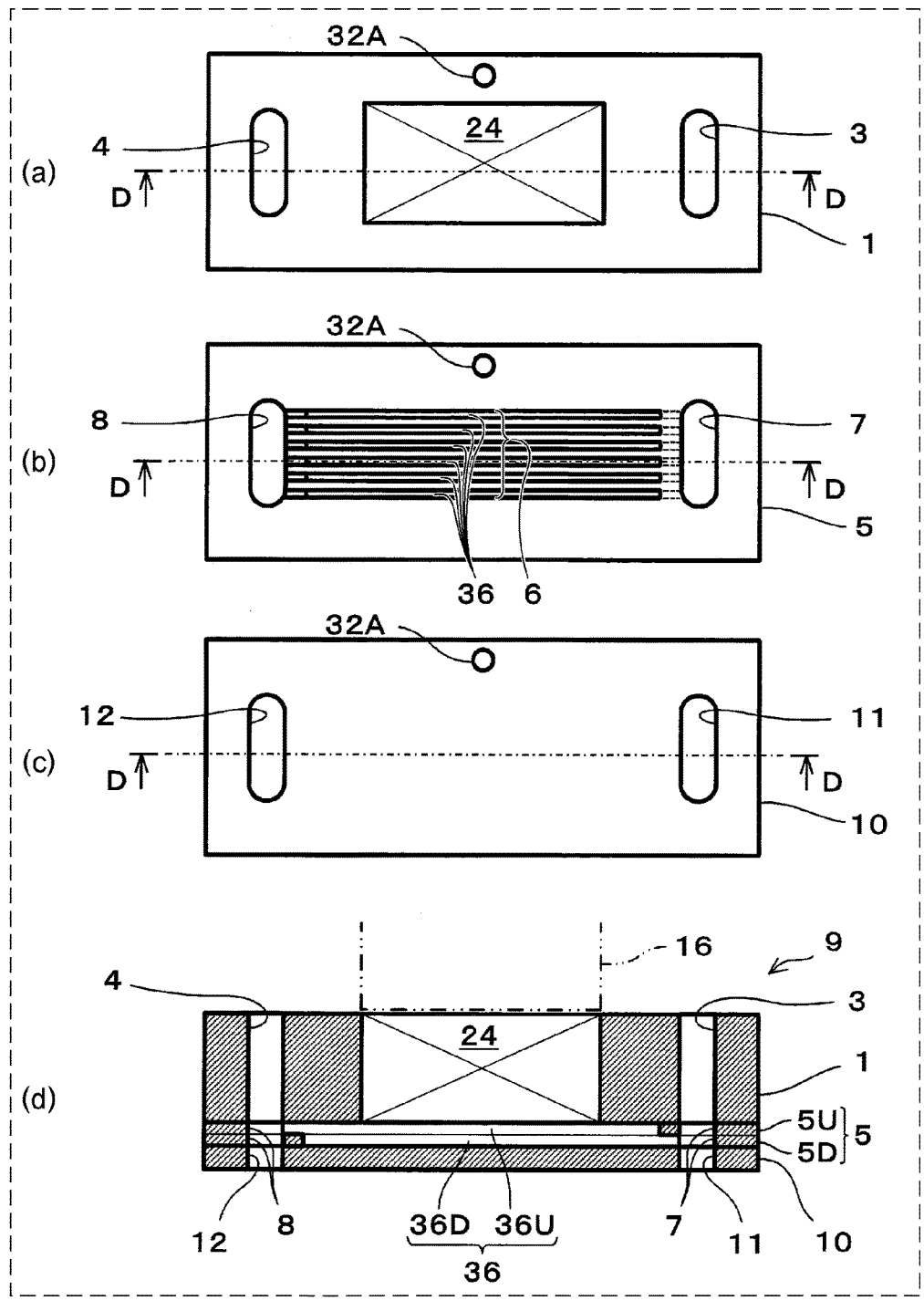
FIG. 11 is a diagram that illustrates one example of an anode gas diffusion device of the electrochemical hydrogen pump of the second embodiment.

FIG. 11 is a diagram that illustrates one example of an anode gas diffusion device of the electrochemical hydrogen pump of the second embodiment. FIG. 11(a) is a diagram of the anode main body 1 of the anode gas diffusion device 9 in a planar view. FIG. 11(b) is a diagram of the anode gas flow path plate 5 of the anode gas diffusion device 9 in a planar view. FIG. 11(c) is a diagram of the anode end plate 10 of the anode gas diffusion device 9 in a planar view.

FIG. 11(d) is a cross-sectional diagram of the anode gas diffusion device 9. That is, FIG. 11(d) illustrates the cross section of the anode gas diffusion device 9 that corresponds to part D-D in a case where members that are illustrated in FIG. 11(a), FIG. 11(b), and FIG. 11(c) in a planar view are laminated.

The configuration of the anode gas diffusion device 9 of the electrochemical hydrogen pump 100 of the second embodiment is similar to the configuration of the anode gas diffusion device 9 of the electrochemical hydrogen pump 100 of the first embodiment, and a description will thus not be made.

Fastening Action of Unit Cell by Fastener

Figure 12:
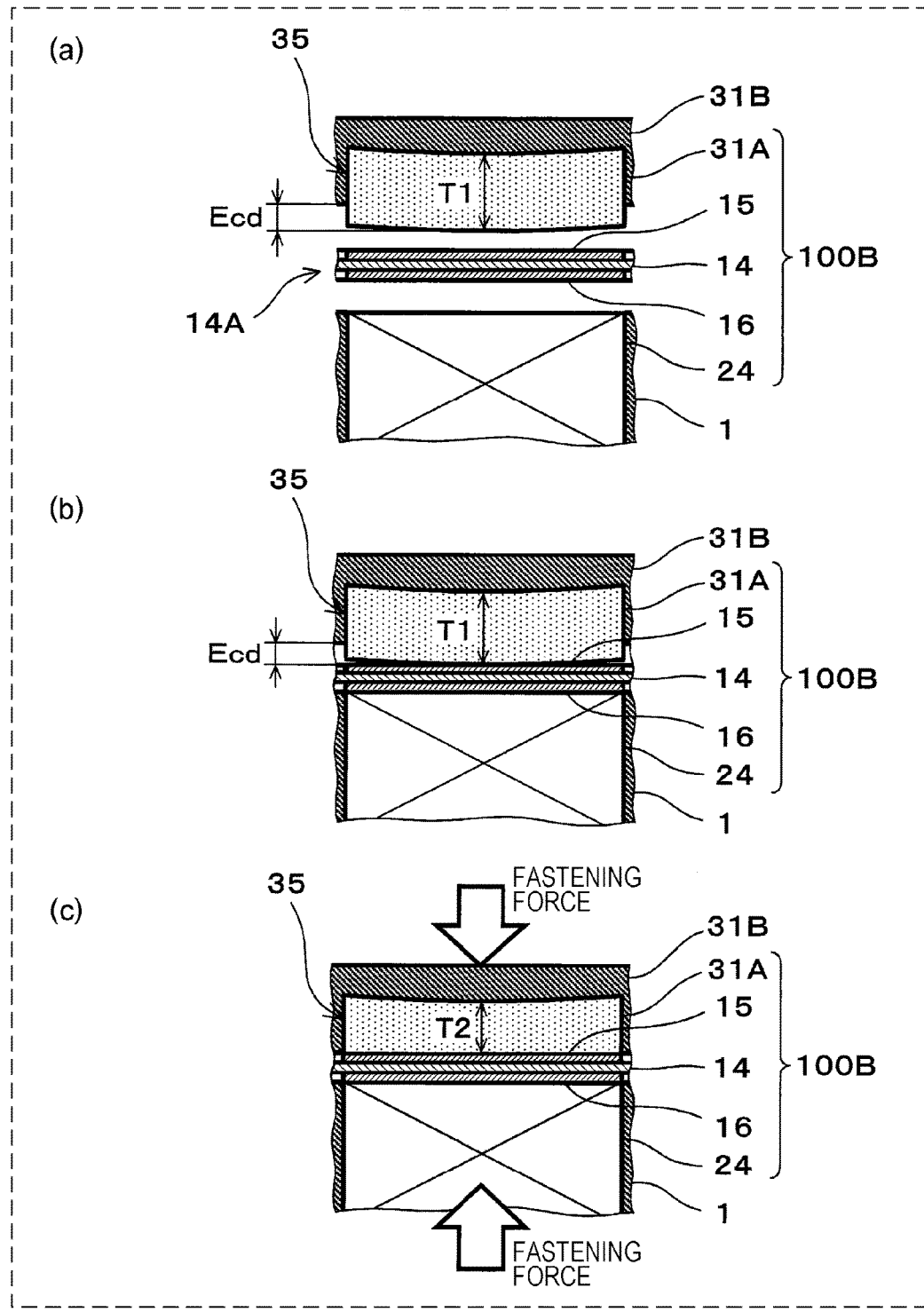
FIG. 12 is a diagram that illustrates one example of a fastening action of a laminated body of the electrochemical hydrogen pump of the second embodiment.

FIG. 12 is a diagram that illustrates one example of a fastening action of a unit cell of the electrochemical hydrogen pump of the second embodiment.

Note that FIG. 12 illustrates cross-sections of the cathode separator 31B, the cathode gas diffusion layer 31A, a member in which the cathode catalyst layer 15 and the anode catalyst layer 16 are respectively coated onto the main surfaces of the electrolyte membrane 14 (hereinafter referred to as the electrolyte membrane (with catalyst layers) 14A), the anode gas diffusion layer 24, and the anode main body 1.

First, as illustrated in FIG. 12(a), position adjustment is performed such that the cathode gas diffusion layer 31A is opposed to the electrolyte membrane (with catalyst layers) 14A and the electrolyte membrane (with catalyst layers) 14A is opposed to the anode gas diffusion layer 24.

Next, as illustrated in FIG. 12(b), the cathode gas diffusion layer 31A, the electrolyte membrane (with catalyst layers) 14A, and the anode gas diffusion layer 24 are laminated. Here, although the central portion of the cathode gas diffusion layer 31A, the electrolyte membrane (with catalyst layers) 14A, and the anode gas diffusion layer 24 are brought into contact, the fastening force by the fastener 27 is not exerted. Thus, the peripheral portion of the cathode gas diffusion layer 31A is separated from the electrolyte membrane (with catalyst layers) 14A, and the gap that is correspondent to the projection amount Ecd in the thickness direction of the cathode gas diffusion layer 31A is formed between the main surface of the cathode separator 31B and the electrolyte membrane (with catalyst layers) 14A.

Next, as illustrated in FIG. 12(c), the fastening of the laminated body 100B by the fastener 27 is performed. Then, the cathode gas diffusion layer 31A is compressed by the fastening force of the fastener 27, and the cathode gas diffusion layer 31A, the electrolyte membrane (with catalyst layers) 14A, and the anode gas diffusion layer 24 are brought into tight contact. In this case, the compression amount (thickness) of the cathode gas diffusion layer 31A is equivalent to the above projection amount Ecd in the central portion and is smaller than the central portion by about the distance Tcd (see FIG. 10) in the peripheral portion. That is, because the gap between the main surface of the cathode separator 31B and the electrolyte membrane (with catalyst layers) 14A does not remain, the value that results from the subtraction of the thickness T2 at a time after compression of the central portion from the original thickness T1 at a time before the compression of the central portion of the cathode gas diffusion layer 31A is equivalent to the above projection amount Ecd.

Consequently, the fastening of the unit cell 100A of the electrochemical hydrogen pump 100 at a time before an operation of the electrochemical hydrogen pump 100 is completed.

Action of Electrochemical Hydrogen Pump

Except for a pressurization action of the cathode gas in the following, the action (operation) of the electrochemical hydrogen pump 100 of the second embodiment is similar to the action (operation) of the electrochemical hydrogen pump 100 of the first embodiment, and a description will thus not be made.

In the pressurization action of the cathode gas of the electrochemical hydrogen pump 100 of this embodiment, the gas pressure P2 of the cathode becomes a high pressure, and the electrolyte membrane 14, the anode catalyst layer 16, and the anode gas diffusion layer 24 are pressed. Then, each of the electrolyte membrane 14, the anode catalyst layer 16, and the anode gas diffusion layer 24 is compressed by this pressing. Accordingly, given that the compressed thickness of the electrolyte membrane 14 is Em, the compressed thickness of the anode catalyst layer 16 is Eac, and the compressed thickness of the anode gas diffusion layer 24 is Ead, the total value Eat of the compressed thicknesses of those is expressed by the following formula (4).

$$Em + Eac + Ead = Eat \tag{4}$$

Here, in a case where the tightness of contact between the cathode catalyst layer 15 and the cathode gas diffusion layer 31A is high, for example, even in a case where the total value Eat of formula (4) increases, a gap is not likely to occur between both of those. On the other hand, in a case where the tightness of contact between the cathode catalyst layer 15 and the cathode gas diffusion layer 31A is low, the gap is likely to occur between both of those. Hypothetically, in a case where the gap occurs between the cathode catalyst layer 15 and the cathode gas diffusion layer 31A, the contact resistance between both of those increases. Then, because the voltage E applied by the voltage applicator 19 increases, the operation efficiency of the electrochemical hydrogen pump 100 may be lowered.

Accordingly, in the electrochemical hydrogen pump 100 of this embodiment, as illustrated in FIG. 10, the central portion of the cathode gas diffusion layer 31A is configured to project by the projection amount Ecd in the thickness direction from the recess portion 35 of the cathode separator 31B before the fastening of the laminated body 100B by the fastener 27. Further, as illustrated in FIG. 12(c), the central portion of the cathode gas diffusion layer 31A is compressed by the projection amount Ecd by the fastener 27 during the fastening of the laminated body 100B.

Further, the above projection amount Ecd (the compressed thickness of the central portion of the cathode gas diffusion layer 31A) is set such that the relationship expressed by the following formula (5) holds between the projection amount Ecd and the total value Eat of formula (4).

That is, the thickness T1 of the cathode gas diffusion layer 31A at a time before the fastening of the laminated body 100B is set such that the size of the compressed thickness of the cathode gas diffusion layer 31A (in this example, the projection amount Ecd) in a case of the fastening of the laminated body 100B is equal to or larger than the total value Eat of the sizes of the respective compressed thicknesses of the anode gas diffusion layer 24, the anode catalyst layer 16, and the electrolyte membrane 14 in a case of the action of the electrochemical hydrogen pump 100.

$$Ecd \geq Em + Eac + Ead = Eat \qquad (5)$$

Consequently, the electrochemical hydrogen pump 100 of this embodiment may simply and appropriately inhibit an increase in the contact resistance between the cathode catalyst layer 15 and the cathode gas diffusion layer 31A compared to related art.

Specifically, in a case where the cathode gas of the electrochemical hydrogen pump 100 becomes a high pressure state in a case of the action of the electrochemical hydrogen pump 100, a high pressure is exerted on the anode gas diffusion layer 24, the anode catalyst layer 16, and the electrolyte membrane 14. Then, each of the anode gas diffusion layer 24, the anode catalyst layer 16, and the electrolyte membrane 14 is compressed and deformed. However, here, in the electrochemical hydrogen pump 100 of this embodiment, the cathode gas diffusion layer 31A elastically deforms in the direction in which the cathode gas diffusion layer 31A is recovered from the compressed thickness T2 by the fastener 27 to the uncompressed and original thickness T1, and the contact between the cathode catalyst layer 15 and the cathode gas diffusion layer 31A may thereby be maintained appropriately. Thus, because a dedicated member for pressing the cathode gas diffusion layer 31A to the cathode catalyst layer 15 is not requested, the above increase in the contact resistance may be inhibited by a simpler configuration than the techniques disclosed in Japanese Unexamined Patent Application Publication No. 2006-70322.

Figure 13:
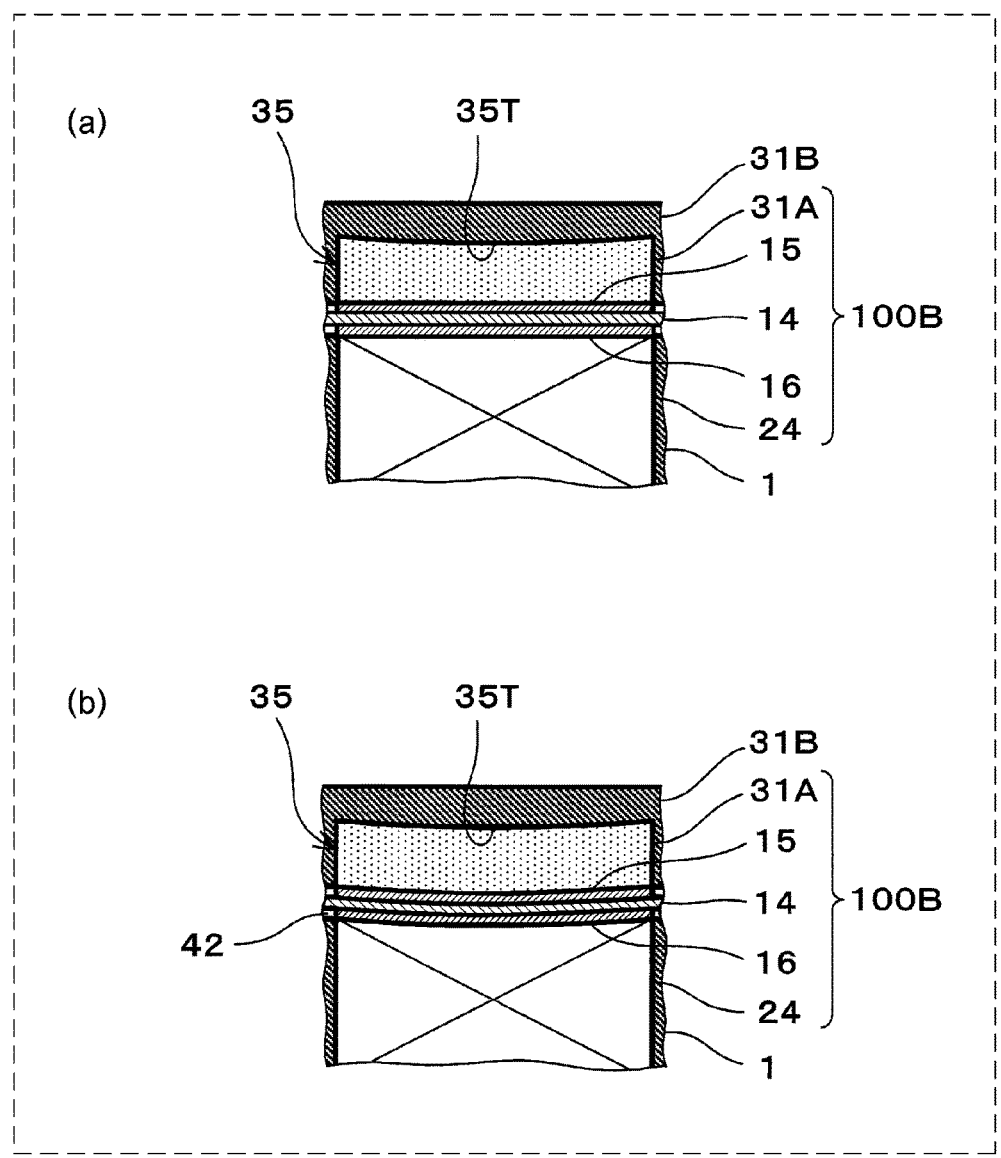
FIG. 13 is a diagram that illustrates one example of deformation of an electrolyte membrane, an anode catalyst layer, and an anode gas diffusion layer in a pressurization action of the electrochemical hydrogen pump of the second embodiment.

Further, as illustrated in FIG. 13, deformation of the electrolyte membrane 14, the anode catalyst layer 16, and the anode gas diffusion layer 24 that occurs in a high pressure state of the cathode gas of the electrochemical hydrogen pump 100 in a case of the action of the electrochemical hydrogen pump 100 does not become uniform in the planes of those. Note that similarly to FIG. 5(c), FIG. 13(a) illustrates a cross section of the laminated body 100B at a time before the pressurization action of the cathode gas of the electrochemical hydrogen pump 100. FIG. 13(b) illustrates a cross section of the laminated body 100B in the pressurization action of the cathode gas of the electrochemical hydrogen pump 100.

As illustrated in FIG. 13(b), in a case where the anode gas diffusion layer 24 is accommodated in the anode main body 1 (anode separator), the compression amount (thickness) of a peripheral portion of the anode gas diffusion layer 24 in the vicinity of the anode main body 1 is smaller than the compression amount (thickness) of a central portion due to the rigidity of the anode main body 1. Further, in a planar view, in a case where the sealing member 42 (for example, a gasket or the like) is provided so as to surround the anode catalyst layer 16, the compression amounts (thicknesses) of the peripheral portions of the anode catalyst layer 16 in the vicinity of the sealing member 42 and the electrolyte membrane 14 are smaller than the compression amounts (thicknesses) of central portions due to the rigidity of the sealing member 42.

Here, hypothetically, in a case where a bottom surface of a recess portion of the cathode separator is a flat surface that is not provided with the protrusion portion, the thickness of the cathode gas diffusion layer 31A at a time after the elastic deformation in the direction in which the cathode gas diffusion layer 31A is recovered from the compressed thickness by the fastener 27 to the uncompressed thickness is thick in the central portion compared to the peripheral portion. Then, because the contact pressure between the cathode catalyst layer 15 and the cathode gas diffusion layer 31A is low in central portions compared to peripheral portions, the contact resistance between both of those possibly becomes non-uniform in the plane. However, in the electrochemical hydrogen pump 100 of this embodiment, the bottom surface of the recess portion 35 of the cathode separator 31B includes the protrusion portion 35T, the above thickness of the cathode gas diffusion layer 31A at a time after the elastic deformation may thereby be made uniform in the plane, and such a possibility may thereby be reduced. That is, the increase in the contact resistance between the cathode catalyst layer 15 and the cathode gas diffusion layer 31A may more appropriately be inhibited than the techniques disclosed in Japanese Unexamined Patent Application Publication No. 2006-111924. Accordingly, because the voltage applied to the electrolyte membrane (with catalyst layers) 14A becomes uniform in the plane, an oxidation reaction in which an electron is liberated from hydrogen and a reduction reaction (hydrogenation reaction) by a proton and an electron in the plane of the electrolyte membrane (with catalyst layers) 14A may be caused to uniformly progress.

In such a manner, the electrochemical hydrogen pump 100 of this embodiment may appropriately inhibit the lowering of the operation efficiency of the electrochemical hydrogen pump 100.

Note that a compression amount Em (thickness) of the electrolyte membrane 14, a compression amount Eac (thickness) of the anode catalyst layer 16, and a compression amount Ead (thickness) of the anode gas diffusion layer 24 change in accordance with configuration materials, initial thicknesses at a time before compression and deformation, and so forth of those. Thus, it may be better to in advance estimate the projection amount Ecd of the cathode gas diffusion layer 31A with respect to each of the configuration materials and initial thicknesses of the electrolyte membrane 14, the anode catalyst layer 16, and the anode gas diffusion layer 24.

Further, the above values also change in accordance with the magnitude of the gas pressure P2 of the cathode in a case of the operation of the electrochemical hydrogen pump 100. Thus, it may be better to set the projection amount Ecd while the maximum value of the gas pressure P2 of the cathode in a case of the operation of the electrochemical hydrogen pump 100 is used as a standard.

Further, the fastening force of the laminated body 100B has to exercise a compression force for compressing the cathode gas diffusion layer 31A by at least the projection amount Ecd. However, it may be better to set the fastening force in consideration of the pressure requested for sustaining gas sealing for the anode gas introduction manifold 28A, the anode gas lead-out manifold 29A, and the cathode gas lead-out manifold and gas sealing for the electrolyte membrane (with catalyst layers) 14A.

First Example

As for the electrochemical hydrogen pump 100 of a first example of the second embodiment, in the electrochemical hydrogen pump 100 of the second embodiment, the above protrusion portion 35T is provided in a region that includes the center of gravity of the bottom surface of the recess portion 35 of the cathode separator 31B.

It is speculated that the compression amounts of the anode catalyst layer 16 and the anode gas diffusion layer 24 are largest at the center of gravity of the bottom surface of the recess portion 35. Accordingly, the contact between the cathode catalyst layer 15 and the cathode gas diffusion layer 31A may be maintained more appropriately.

Except for the above features, the electrochemical hydrogen pump 100 of this example may be configured similarly to the electrochemical hydrogen pump 100 of the second embodiment.

Second Example

As for the electrochemical hydrogen pump 100 of a second example of the second embodiment, in the electrochemical hydrogen pump 100 of the second embodiment or the first example of the second embodiment, the above protrusion portion is provided in a region except a periphery of the recess portion 35 of the cathode separator 31B.

In a case where the cathode gas diffusion layer 31A is accommodated in the recess portion 35 of the cathode separator 31B, in the region except the periphery of the recess portion 35 of the cathode separator 31B, the electrolyte membrane 14, the anode catalyst layer 16, and the anode gas diffusion layer 24 are necessarily pressed due to a high pressure of the cathode gas of the electrochemical hydrogen pump 100 in a case of the action of the electrochemical hydrogen pump 100. Thus, the protrusion portion 35T is provided in this region, and a possibility that the contact resistance between the cathode catalyst layer 15 and the cathode gas diffusion layer 31A becomes non-uniform in the plane may thereby be reduced effectively.

Except for the above features, the electrochemical hydrogen pump 100 of this example may be configured similarly to the electrochemical hydrogen pump 100 of the second embodiment or the first example of the second embodiment.

Third Example

As for the electrochemical hydrogen pump 100 of a third example of the second embodiment, in the electrochemical hydrogen pump 100 of any of the second embodiment and the first example and the second example of the second embodiment, the size of the thickness T1 of the cathode gas diffusion layer 31A is equal to or larger than the size of the depth of the peripheral portion of the recess portion 35 of the cathode separator 31B.

In a case where the cathode gas diffusion layer 31A is accommodated in the recess portion 35 of the cathode separator 31B, even in the peripheral portion of the recess portion 35 of the cathode separator 31B, the electrolyte membrane 14, the anode catalyst layer 16, and the anode gas diffusion layer 24 are pressed due to a high pressure of the cathode gas of the electrochemical hydrogen pump 100 in a case of the action of the electrochemical hydrogen pump 100. Accordingly, in the electrochemical hydrogen pump 100 of this example, the above configuration may appropriately maintain the contact between the cathode catalyst layer 15 and the cathode gas diffusion layer 31A also in the above peripheral portion.

Except for the above features, the electrochemical hydrogen pump 100 of this example may be configured similarly to the electrochemical hydrogen pump 100 of any of the second embodiment and the first example and the second example of the second embodiment.

Fourth Example

As for the electrochemical hydrogen pump 100 of a fourth example of the second embodiment, in the electrochemical hydrogen pump 100 of any of the second embodiment and the first example to the third example of the second embodiment, the cathode gas diffusion layer 31A has higher rigidity on the side that faces the cathode separator 31B than the side that corresponds to the cathode catalyst layer 15.

Note that work and effect that are provided by the cathode gas diffusion layer 31A of the electrochemical hydrogen pump 100 of this example, an adjustment method of the rigidity of the cathode gas diffusion layer 31A, a measurement method of the rigidity of the cathode gas diffusion layer 31A, and so forth are similar to the electrochemical hydrogen pump 100 of the first example of the first embodiment, and a description will thus not be made.

Fifth Example

As for the electrochemical hydrogen pump 100 of the fifth example of the second embodiment, in the electrochemical hydrogen pump 100 of any of the second embodiment and the first example to the fourth example of the second embodiment, the cathode gas diffusion layer 31A has higher porosity on the side that faces the cathode catalyst layer 15 than the side that corresponds to the cathode separator 31B.

Note that work and effect that are provided by the cathode gas diffusion layer 31A of the electrochemical hydrogen pump 100 of this example, an adjustment method of the porosity of the cathode gas diffusion layer 31A, a measurement method of the porosity of the cathode gas diffusion layer 31A, and so forth are similar to the electrochemical hydrogen pump 100 of the second example of the first embodiment, and a description will thus not be made.

Sixth Example

As for the electrochemical hydrogen pump 100 of a sixth example of the second embodiment, in the electrochemical hydrogen pump 100 of any of the second embodiment and the first example to the fifth example of the second embodiment, the cathode gas diffusion layer 31A is configured with a sintered body of metal fiber.

Note that work and effect that are provided by the cathode gas diffusion layer 31A of the electrochemical hydrogen pump 100 of this example, a specific example of a sintered metal fiber body that configures the cathode gas diffusion layer 31A, and so forth are similar to the electrochemical hydrogen pump 100 of the third example of the first embodiment, and a description will thus not be made.

Seventh Example

Figure 14:
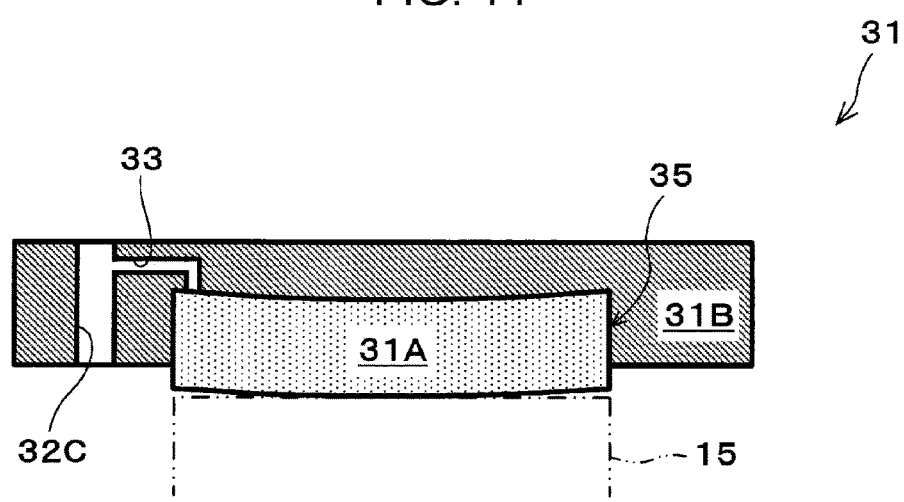
FIG. 14 is a diagram that illustrates one example of the cathode gas diffusion device of the electrochemical hydrogen pump of a seventh example of the second embodiment.

FIG. 14 is a diagram that illustrates one example of the cathode gas diffusion device of the electrochemical hydrogen pump of a seventh example of the second embodiment.

As for the electrochemical hydrogen pump 100 of the seventh example of this embodiment, in the electrochemical hydrogen pump 100 of any of the second embodiment and the first example to the sixth example of the second embodiment, the cathode separator 31B includes the manifold hole 32C through which the cathode gas flows and the cathode gas flow path 33 that leads out the cathode gas in the recess portion 35 of the cathode separator 31B to a manifold hole. Note that a specific configuration of the cathode gas flow path 33 and a configuration of the cathode gas lead-out manifold are similar to the cathode gas diffusion device 31 of the first embodiment, and a description will thus not be made.

Consequently, the cathode gas may be taken out from the cathode gas diffusion layer 31A in a high pressure state through the cathode gas flow path 33. The cathode gas that passes through the cathode gas flow path 33 flows through the cathode gas lead-out manifold and the cathode gas lead-out pipe 30 in this order.

Except for the above features, the electrochemical hydrogen pump 100 of this example may be configured similarly to the electrochemical hydrogen pump 100 of any of the second embodiment and the first example to the sixth example of the second embodiment.

Note that the first embodiment, the first to third examples of the first embodiment, the first and second modification examples of the first embodiment, the second embodiment, and the first to seventh examples of the second embodiment may be combined with each other unless those exclude each other.

Further, from the above description, many modifications and other embodiments of the present disclosure are obvious for a person having ordinary skill in the art. Therefore, the above description should be construed as only examples and is provided for the purpose of teaching a person having ordinary skill in the art the best modes for carrying out the present disclosure. Details of structures and/or functions may substantially be changed without departing from the spirit of the present disclosure.

One aspect of the present disclosure may be used for an electrochemical hydrogen pump that may simply and appropriately inhibit an increase in a contact resistance between a cathode catalyst layer and a cathode gas diffusion layer compared to related art.

What is claimed is:

1. An apparatus comprising:
   an electrolyte membrane that includes a pair of main surfaces;
   a cathode catalyst layer that is provided to one main surface of the electrolyte membrane;
   an anode catalyst layer that is provided to the other main surface of the electrolyte membrane;
   a cathode gas diffusion layer that is provided on a main surface of the cathode catalyst layer which does not face the electrolyte membrane;
   a separator that includes a recess through which cathode gas led out from the cathode gas diffusion layer flows;
   an anode gas diffusion layer that is provided on a main surface of the anode catalyst layer which does not face the electrolyte membrane;
   a voltage applicator that applies a voltage between the cathode catalyst layer and the anode catalyst layer; and
   a fastener that fastens a laminated body of the electrolyte membrane, the cathode catalyst layer, the anode catalyst layer, the cathode gas diffusion layer, and the anode gas diffusion layer, wherein
   the cathode gas diffusion layer is accommodated in the recess, is disposed to project from the recess in a thickness direction of the recess before fastening of the laminated body, and includes an elastic member between a side surface of the cathode gas diffusion layer and a side surface of the recess.

2. The apparatus according to claim 1, wherein a thickness of the cathode gas diffusion layer at a time before fastening of the laminated body is set such that a size of a compressed thickness of the cathode gas diffusion layer in a case of fastening of the laminated body is equal to or larger than a total value of sizes of respective compressed thicknesses of the anode gas diffusion layer, the anode catalyst layer, and the electrolyte membrane in a case of an action.

3. The apparatus according to claim 1, wherein the cathode gas diffusion layer has higher rigidity on a side that faces the separator than a side that faces to the cathode catalyst layer.

4. The apparatus according to claim 1, wherein the cathode gas diffusion layer has higher porosity on a side that faces the cathode catalyst layer than a side that faces to the separator.

5. The apparatus according to claim 1, wherein the separator includes a manifold hole through which the cathode gas flows and a gas flow path that leads out the cathode gas in the recess to the manifold hole.

6. The apparatus according to claim 1, wherein the cathode gas diffusion layer is configured with a sintered body of metal fiber.

* * * * *